(12) United States Patent
Tanabe et al.

(10) Patent No.: US 11,505,152 B2
(45) Date of Patent: Nov. 22, 2022

(54) VEHICLE SEAT

(71) Applicants: TS TECH CO., LTD., Asaka (JP); HONDA MOTOR CO., LTD., Tokyo (JP); TACHI-S CO., LTD., Akishima (JP)

(72) Inventors: Jinichi Tanabe, Tochigi (JP); Tetsumei Mochizuki, Wako (JP); Soichi Nishikawa, Wako (JP); Tomoyo Futakawame, Wako (JP); Kazuo Noguchi, Akishima (JP); Ryou Kurobe, Akishima (JP)

(73) Assignees: TS Tech Co., Ltd., Saitama (JP); Honda Motor Co., Ltd., Tokyo (JP); Tachi—S Co., Ltd, Tokyo (JP)

( * ) Notice: Subject to any disclaimer, the term of this patent is extended or adjusted under 35 U.S.C. 154(b) by 268 days.

(21) Appl. No.: 17/016,983

(22) Filed: Sep. 10, 2020

(65) Prior Publication Data
US 2021/0078518 A1 Mar. 18, 2021

(30) Foreign Application Priority Data
Sep. 13, 2019 (JP) .............................. JP2019-167389

(51) Int. Cl.
*B60R 21/207* (2006.01)
*B60N 2/64* (2006.01)
(Continued)

(52) U.S. Cl.
CPC .......... *B60R 21/207* (2013.01); *B60N 2/5816* (2013.01); *B60N 2/64* (2013.01);
(Continued)

(58) Field of Classification Search
CPC .............. B60R 21/207; B60R 21/2165; B60R 21/23138; B60N 2/5816; B60N 2/64
See application file for complete search history.

(56) References Cited

U.S. PATENT DOCUMENTS 9,079,556 B2 * 7/2015 Tanabe .................... B60R 21/26
9,321,418 B2 * 4/2016 Sahashi ................ B60R 21/207
(Continued)

FOREIGN PATENT DOCUMENTS

DE 19746387 A1 * 4/1998 ........... B60R 21/207
DE 102015207487 A1 * 10/2015 ............... B60N 2/58
(Continued)

OTHER PUBLICATIONS

Official Communication dated Apr. 6, 2022 issued over the corresponding Japanese Patent Application No. 2019-167389 with the English machine translation thereof.

*Primary Examiner* — Faye M Fleming
(74) *Attorney, Agent, or Firm* — Carrier Blackman & Associates P.C.; Joseph P Carrier; Fulchand P. Shende

(57) ABSTRACT

In a vehicle seat, a back pad outer skin covering a surface of a back pad includes a first portion covering a surface of one part, including a side face, of a bolster pad part, and second portions covering a surface of another part that is different from the one part of the bolster pad part. A bound part is formed by binding to each other mutually adjacent end parts of the first portion and the second portions and extremity parts of expansive force transmission webbings having base portions fixed to a frame, the bound part being capable of breaking when an airbag is made to expand. A non-stretchable cloth member is disposed on a reverse side of specific outer skin portions, covering a front face of the bolster pad part, of the second portions.

17 Claims, 12 Drawing Sheets

(51) Int. Cl.
  *B60R 21/2165*  (2011.01)
  *B60N 2/58*    (2006.01)
  *B60R 21/231*  (2011.01)
  *B60R 21/26*   (2011.01)
  *B60R 21/237*  (2006.01)

(52) U.S. Cl.
  CPC .... B60R 21/2165 (2013.01); B60R 21/23138 (2013.01); B60R 21/26 (2013.01); B60R 21/237 (2013.01); *B60R 2021/23146* (2013.01)

(56) References Cited

U.S. PATENT DOCUMENTS

| | | | |
|---|---|---|---|
| 9,393,893 B2* | 7/2016 | Kozaki | B60N 2/58 |
| 9,539,975 B2* | 1/2017 | Tanabe | B60N 2/68 |
| 10,251,491 B2 | 4/2019 | Nishino et al. | |
| 10,994,686 B2* | 5/2021 | Inoue | B60R 21/215 |
| 11,279,312 B2* | 3/2022 | Akai | B60R 21/2165 |
| 2014/0375028 A1* | 12/2014 | Sahashi | B60R 21/207 |
| | | | 280/728.3 |

FOREIGN PATENT DOCUMENTS

| | | | | |
|---|---|---|---|---|
| EP | 2939886 B1 * | 12/2018 | ........... | B60N 2/5816 |
| JP | H11-115676 A | 4/1999 | | |
| JP | 2007-176347 A | 7/2007 | | |
| JP | 2013-199152 A | 10/2013 | | |
| JP | 2014-129059 A | 7/2014 | | |
| JP | 2014-210475 A | 11/2014 | | |
| JP | 2015-003578 A | 1/2015 | | |
| JP | 2016-097275 A | 5/2016 | | |
| JP | 2016-097950 A | 5/2016 | | |
| JP | 2017-099506 A | 6/2017 | | |
| JP | 2018-007717 A | 1/2018 | | |
| WO | 2017/056521 A1 | 4/2017 | | |

* cited by examiner

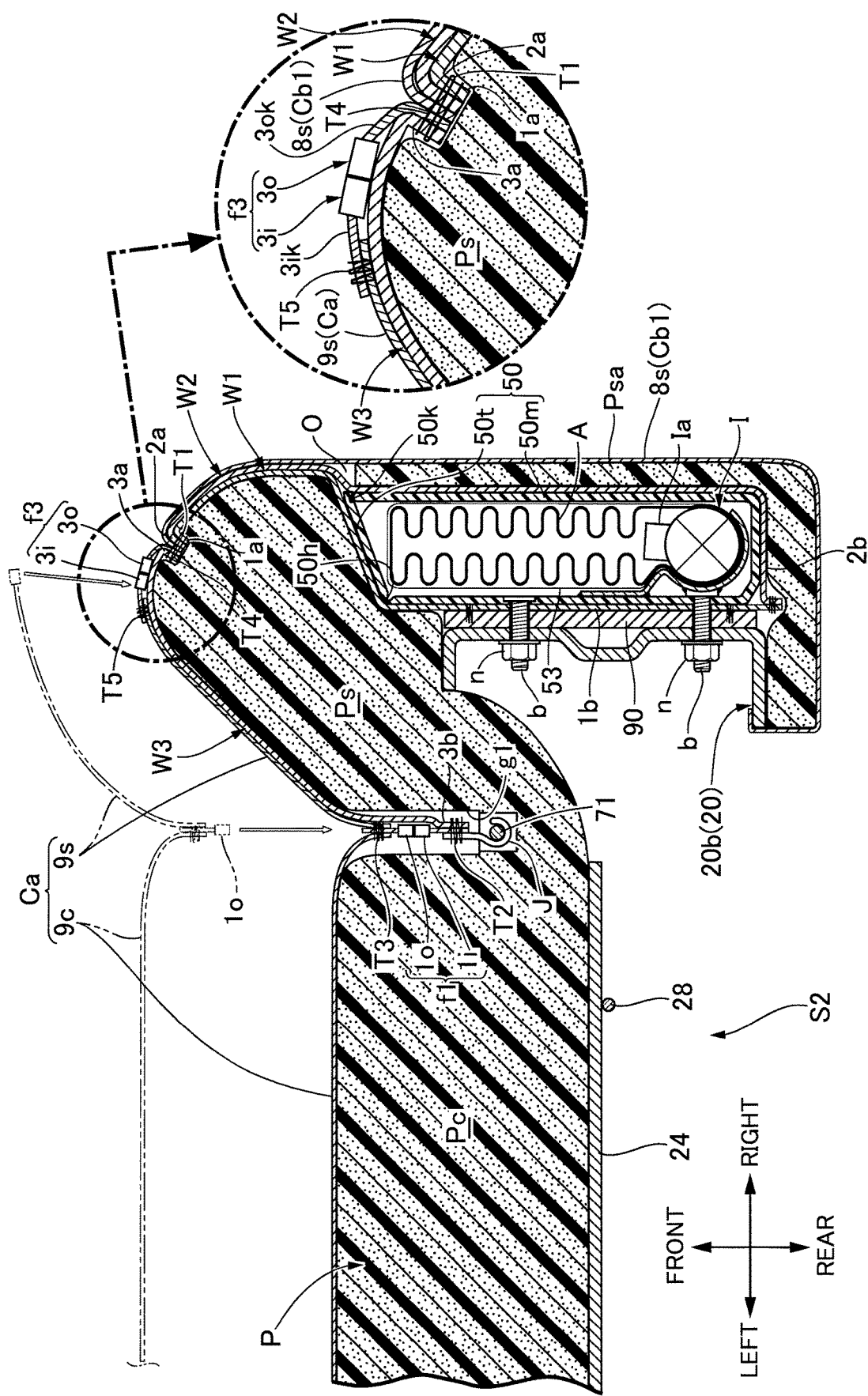

VEHICLE SEAT

CROSS REFERENCE TO RELATED APPLICATIONS

The present application claims priority under 35 U.S.C. § 119 to Japanese Patent Application No. 2019-167389 filed Sep. 13, 2019 the entire contents of which are hereby incorporated by reference.

BACKGROUND OF THE INVENTION

Field of the Invention

The present invention relates to a vehicle seat, particularly, a vehicle seat which includes a back pad supported on a frame and supporting a back of an occupant, the back pad having a middle pad part and left and right bolster pad parts connected to left and right sides of the middle pad part, a back pad outer skin covering a surface of the back pad and having a cover skin detachably mounted on a seat back.

Description of the Related Art

The vehicle seat is conventionally known, as shown in for example Japanese Patent Application Laid-open Nos. 2018-7717 and 2016-97275, and this arrangement has the advantage that the cover skin for the seat back can be replaced and exchanged with another cover skin as appropriate and as necessary. In a vehicle seat having such a cover skin, a specific outer skin portion (for example, a cover skin or a base skin superimposed on a cover skin reverse face) of the back pad outer skin that covers a back pad front face is usually formed from an easily stretchable material.

On the other hand, a vehicle seat in which an airbag module is provided in a bolster pad part on the door side is conventionally known, as shown in for example Japanese Patent Application Laid-open No. 2014-210475, and in this arrangement mutually adjacent end parts of a front face skin and a side face skin of the bolster pad part on the door side are bound together with an extremity part of an expansive force transmission webbing, the bound part of the skin (functioning as a so-called tear line) will be broken by receiving the expansive force of the airbag at the initial stage of expansion of the airbag via the expansive force transmission webbing, and the airbag is made to deploy substantially toward the front side of the vehicle from the broken part.

In the airbag-equipped seat of Japanese Patent Application Laid-open No. 2014-210475, since the front face skin of the bolster pad part is formed from a material that is difficult to stretch, even when the bound part of the skin receives an expansive force toward the door side of the airbag in the initial stage of expansion of the airbag, the front face skin does not stretch toward the door side. Because of this, the bound part of the skin can be quickly broken at an appropriate position by the expansive force of the airbag, and the airbag can be deployed appropriately substantially toward the front side of the vehicle.

However, if the airbag-equipped seat structure of Japanese Patent Application Laid-open No. 2014-210475 is applied as it is to a seat with a detachable cover skin as in that of Japanese Patent Application Laid-open Nos. 2018-7717 and 2016-97275, the following problems occur. That is, due to the specific outer skin portion of the back pad outer skin of Japanese Patent Application Laid-open No. 2018-7717 and Japanese Patent Application Laid-open No. 2016-97275 being an easily stretchable material as described above, when the expansive force of the airbag is applied to the bound part of the skin via the expansive force transmission webbing in the initial stage of expansion, the specific outer skin portion receives an expansive force and stretches toward the door side, and breaking occurs in a state in which said stretching has made the bound part of the skin move toward the door side by a considerable amount (see for example the double-dotted broken line in FIG. 6B). Because of this, the airbag expands and is deployed obliquely forward quite close to the door (see for example the double-dotted broken line in FIG. 6C), and this cannot be said to be an advantageous deployment mode in terms of appropriately protecting any of a head part, a chest part, and a lumbar region of an occupant.

SUMMARY OF THE INVENTION

The present invention has been proposed in light of the above circumstances, and it is an object thereof to provide a vehicle seat that can prevent the above problems even when an airbag module is provided within a bolster pad part of a seat in which a cover skin is detachably mounted on a seat back.

In order to achieve the object, according to a first aspect of the present invention, there is provided a vehicle seat comprising a seat back that includes a back pad supported on a frame and supporting a back of an occupant, the back pad having a middle pad part and left and right bolster pad parts connected to left and right sides of the middle pad part, and a back pad outer skin covering a surface of the back pad, the back pad outer skin having a cover skin detachably mounted on the seat back, and the bolster pad part on a door side having thereinside an airbag module including an airbag, the back pad outer skin having a first portion covering a surface of one part, including a side face, of the bolster pad part, and a second portion covering a surface of another part that is different from the one part of the bolster pad part, a bound part being formed by binding to each other mutually adjacent end parts of the first portion and the second portion and an extremity part of an expansive force transmission webbing having a base portion fixed to the frame, the bound part being capable of breaking when the airbag is made to expand, and a non-stretchable cloth member being disposed on a reverse side of a specific outer skin portion, covering a front face of the bolster pad part, of the second portion.

In accordance with the first aspect, in the vehicle seat in which the bound part of the skin, which is the starting point of breaking in the back pad outer skin when the airbag expands, is broken by receiving the expansive force of the airbag via the expansive force transmission webbing, thus allowing the airbag to be deployed forward, the non-stretchable cloth member is disposed on the reverse side of the specific outer skin portion, covering the front face of the bolster pad part, of the second portion of the back pad outer skin. Accordingly, the cloth member enables stretching of the specific outer skin portion toward to the door side by the expansive force in the initial stage of expansion of the airbag to be suppressed effectively even if the specific outer skin portion of the back pad outer skin is an easily stretchable material, and it is therefore possible to minimize displacement of the bound part toward the door side, thus making breaking at a proper position possible. Therefore, even when the airbag module is placed in the bolster pad part of the seat back, where a detachable cover skin is included in the back pad outer skin, the airbag can be expanded and deployed substantially toward the front side of the vehicle, and this is advantageous in terms of appropriately protecting any of a head part, a chest part, and a lumbar region of an occupant.

According to a second aspect of the present invention, in addition to the first aspect, the back pad outer skin includes a base skin retained by the frame or the back pad, and a cover skin that is detachable from the base skin, and the base skin includes on left and right a first base skin portion forming the first portion and a second base skin portion forming the second portion.

In accordance with the second aspect, since the back pad outer skin includes the base skin retained by the frame or the back pad, and the cover skin, which is detachable from the base skin, and the base skin includes on the left and right the first base skin portion forming the first portion and the second base skin portion forming the second portion, it becomes possible to dispose the cloth member neatly between the reverse side of the second base skin portion of the base skin and the front face of the bolster pad part, and there is no possibility that the cloth member will be exposed.

According to a third aspect of the present invention, in addition to the second aspect, the cloth member includes a base portion fixed to the frame or the back pad and an extremity portion bound together with the second base skin portion and an extremity portion of the expansive force transmission webbing by the bound part, and an intermediate part of the cloth member is disposed so as to transect a front face of the bolster pad part and overlap a reverse face of the specific outer skin portion.

In accordance with the third aspect, since the extremity part of the cloth member having its base part fixed to the frame or the back pad is bound together with the extremity parts of the second base skin portion and the expansive force transmission webbing, it is possible to mount the cloth member on the seat back with a simple structure. Since the intermediate part of the cloth member is disposed so as to transect the front face of the bolster pad part on the door side and overlap the reverse face of the specific outer skin portion of the second base skin portion, it is possible to easily maneuver the cloth member between the reverse face of the specific outer skin portion and the front face of the bolster pad part.

According to a fourth aspect of the present invention, in addition to the second aspect, the second base skin portion at least partially includes a specific portion covering a front face of the bolster pad part, and the specific portion and a portion, overlapping the specific portion, of the cover skin form the specific outer skin portion.

In accordance with the fourth aspect, since the second base skin portion at least partially includes the specific portion covering a front face of the bolster pad part, and the specific portion and the portion, which overlaps the specific portion, of the cover skin form the specific outer skin portion, even when the cover skin is removed from the base skin, the front face of the bolster pad part and the cloth member can be covered neatly by the second base skin portion.

According to a fifth aspect of the present invention, in addition to the second aspect, a portion, directly covering a front face of the bolster pad part without the second base skin portion interposed therebetween, of the cover skin forms the specific outer skin portion.

In accordance with the fifth aspect, since a portion of the cover skin, directly covering the front face of the bolster pad part without the second base skin portion interposed therebetween, forms the specific outer skin portion, even if the front face of the bolster pad part or the cloth member is exposed when the cover skin is removed, in a normal state of use where the cover skin is refitted, it is possible to cover them neatly with the cover skin.

According to a sixth aspect of the present invention, in addition to the first aspect, the cover skin is attached to the first portion by a fastener, and a mounting piece portion, extending on the first portion side, of the fastener is bound together with the extremity portion of the expansive force transmission webbing, by the bound part.

In accordance with the sixth aspect, since the cover skin is mounted on the first portion by the fastener, and the mounting piece part, extending toward the first portion, of the fastener is bound by the bound part together with the extremity part of the expansive force transmission webbing, the cover skin can easily be mounted on the first portion via the fastener.

According to a seventh aspect of the present invention, in addition to the first aspect, the back pad outer skin includes a base skin forming the first portion and a cover skin forming the second portion, the cover skin is attached to the first portion by a fastener, and a mounting piece portion, extending on the first portion side, of the fastener is bound together with the extremity portion of the expansive force transmission webbing by the bound part.

In accordance with the seventh aspect, since the back pad outer skin has the base skin forming the first portion and the cover skin forming the second portion, the cover skin is mounted on the first portion by the fastener, and the mounting piece part, extending toward the first portion side, of the fastener is bound by the bound part together with the extremity part of the expansive force transmission webbing, the cover skin can easily be mounted on the base skin of the back pad outer skin via the fastener.

According to an eighth aspect of the present invention, in addition to the seventh aspect, the cloth member includes a base portion fixed to the frame or the back pad and an extremity portion bound together with the mounting piece portion and the extremity portion of the expansive force transmission webbing by the bound part, and an intermediate part of the cloth member is disposed so as to transect a front face of the bolster pad part and overlap a reverse face of the specific outer skin portion.

In accordance with the eighth aspect, since the cloth member includes the base portion fixed to the frame or the back pad and the extremity portion bound together with the mounting piece portion and the extremity portion of the expansive force transmission webbing by the bound part, and the intermediate part of the cloth member is disposed so as to transect the front face of the bolster pad part and overlap the reverse face of the specific outer skin portion, the cloth member can be mounted on the seat back with a simple structure. Moreover, since the intermediate part of the cloth member is disposed so as to transect the front face of the bolster pad part on the door side and overlap the reverse face of the specific outer skin portion of the second portion, it is possible to easily maneuver the cloth member between the reverse face of the specific outer skin portion and the front face of the bolster pad part.

According to a ninth aspect of the present invention, in addition to the first aspect, at least the specific outer skin portion of the back pad outer skin is formed from a material that is easier to stretch than the cloth member to such a degree that the material stretches in a vehicle width direction by receiving an expansive force of the airbag.

In accordance with the ninth aspect, since at least the specific outer skin portion of the back pad outer skin is formed from a material that is easier to stretch than the cloth member to such a degree that the material stretches in the vehicle width direction by receiving an expansive force of the airbag, if there were no cloth member, when the expansive force of the airbag in the initial stage of expansion acted on the bound part via the expansive force transmission webbing, the specific outer skin portion would receive the expansive force and stretch toward the door side, and would break in a state in which the bound part had moved by a considerable amount toward the door side together with said stretching, but this problem can be solved by the first aspect.

According to a tenth aspect of the present invention, in addition to the first aspect, the expansive force transmission webbing is formed so as to have a vertical width that is substantially same as or larger than a vertical width of the airbag module from the base portion to the extremity portion of the expansive force transmission webbing.

In accordance with the tenth aspect, since the expansive force transmission webbing is formed so as to have the vertical width that is substantially the same as or larger than the vertical width of the airbag module from the base portion to the extremity portion, in the initial stage of expansion of the airbag the expansive force of the airbag can be received effectively by the wide expansive force transmission webbing, thereby enabling the expansive force of the airbag to be efficiently transmitted to the bound part to thus appropriately break the bound part.

According to an eleventh aspect of the present invention, in addition to the first aspect, the cloth member is formed from a stretch-suppressing webbing.

In accordance with the eleventh aspect, it is possible by the cloth member to suppress effectively stretching of the specific outer skin portion toward the door side caused by the airbag expansive force in the initial stage of expansion of the airbag.

According to a twelfth aspect of the present invention, in addition to the eleventh aspect, at least an extremity portion of the stretch-suppressing webbing is formed so as to have a smaller width than that of the expansive force transmission webbing in an up-down direction.

In accordance with the twelfth aspect, since at least the extremity portion of the stretch-suppressing webbing is formed so as to have a smaller width than that of the expansive force transmission webbing in the up-down direction, it is possible to reduce the dimensions of the stretch-suppressing webbing itself, and consequently to reduce the cost, while enabling stretching of the specific outer skin portion toward the door side caused by the expansive force of the airbag in the initial stage of expansion of the airbag to be suppressed by the stretch-suppressing webbing.

According to a thirteenth aspect of the present invention, in addition to the eleventh aspect, the stretch-suppressing webbing is formed into a strip shape having a smaller width than that of the expansive force transmission webbing in the up-down direction.

In accordance with the thirteenth aspect, since the stretch-suppressing webbing is formed into a strip shape having a smaller width than that of the expansive force transmission webbing in the up-down direction, it is possible to minimize, to the minimum necessary, the dimensions of the stretch-suppressing webbing itself, and consequently to further reduce the cost, while enabling stretching of the specific outer skin portion toward the door side caused by the expansive force of the airbag in the initial stage of expansion of the airbag to be suppressed by the stretch-suppressing webbing.

According to a fourteenth aspect of the present invention, in addition to the twelfth aspect, the airbag module includes at least the airbag in a folded state and an inflator capable of blowing out a high pressure gas into the airbag and making the airbag expand toward a front side of a vehicle, and the extremity portion, bound by the bound part, of the stretch-suppressing webbing is disposed at substantially same height as that of a high pressure gas-blowing out hole, opening toward the front side of the vehicle, of the inflator.

In accordance with the fourteenth aspect, since the extremity portion, bound by the bound part, of the stretch-suppressing webbing is disposed at substantially the same height as that of the high pressure gas-blowing out hole, opening toward the front side of the vehicle, of the inflator, not only can a flow of a high pressure gas blowing out from the high pressure gas-blowing out hole be concentrated on a region of part of the bound part, but the narrow extremity portion of the stretch-suppressing webbing can also be joined to the bound part at a position corresponding to this concentrated part. This enables a stretch-suppressing effect to be efficiently exhibited toward the specific outer skin portion even when the extremity part is a narrow (and consequently a relatively small size) stretch-suppressing webbing.

According to a fifteenth aspect of the present invention, in addition to the first aspect, the cloth member is formed so as to have a vertical width that is same as or greater than the vertical width of the expansive force transmission webbing in an up-down direction.

In accordance with the fifteenth aspect, since the cloth member is formed so as to have the vertical width that is the same as or greater than the vertical width of the expansive force transmission webbing in the up-down direction, it is possible to make the cloth member exhibit a strength that is the same as or greater than that of the expansive force transmission webbing.

According to a sixteenth aspect of the present invention, in addition to the first aspect, the bound part is disposed on a border part between a front face and a side face of the bolster pad part or in a vicinity of the border part.

In accordance with the sixteenth aspect, since the bound part is disposed on the border part between the front face and the side face of the bolster pad part on the door side or in the vicinity of the border part, the cloth member can be made as short as possible in a direction transecting the front face of the bolster pad part, the cloth member thereby quickly attains a taut state in the initial stage of expansion of the airbag, and a stretch-suppressing effect can be exhibited quickly and appropriately toward the specific outer skin portion.

According to a seventeenth aspect of the present invention, in addition to the first aspect, a pulling-in member for pulling in the specific outer skin portion into a pulling-in groove provided between the bolster pad part and the middle pad part is mounted directly or indirectly on the frame or the back pad, and a base portion of the cloth member is fixed to the pulling-in member.

In accordance with the seventeenth aspect, since the base part of the cloth member is fixed to the pulling-in member for pulling in the skin, the pulling-in member can be used also as means for supporting the cloth member, thus enabling simplification of the structure to be achieved.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 10 is a sectional view, corresponding to FIG. 8, showing a fifth embodiment of the present invention.

DESCRIPTION OF THE PREFERRED EMBODIMENTS

Embodiments of the present invention are explained below by reference to the attached drawings. In the present specification, front/rear, left/right, and up/down are the front/rear, left/right, and up/down as viewed by an occupant seated on a seat.

First, referring to FIG. 1 to FIG. 5, the structure of a first embodiment is explained. An automobile seat S as a vehicle seat includes a seat sitting part S1 supporting the buttocks of an occupant from below, a seat back S2 supporting the back of the occupant from behind, and a headrest part S3 fitted to an upper part of the seat back S2.

In the illustrated example, a seat for a driver's seat is illustrated, but a seat for a passenger seat is basically the same as the seat for a driver's seat except that the place where an airbag module M, which is described later, is disposed is reversed left and right.

The seat sitting part S1 includes a sitting part pad, which is not illustrated, covered with a skin 10, and a sitting part frame F1 supporting the sitting part pad. The sitting part frame F1 is supported on a vehicle body floor 30 such that the front-rear position can be adjusted via a conventionally known front-rear position adjustment mechanism (not illustrated).

On the other hand, the seat back S2 includes a back pad P, a back frame F2 supporting the back pad P from the reverse face side, and a seat back outer skin C covering the surface of the back pad P. The back frame F2 is supported on a rear part of the sitting part frame F1 via a conventionally known reclining mechanism 32, and the raised angle of the seat back S2 can be freely adjusted and fixed by the reclining mechanism 32.

The structure of the seat back S2 is now specifically explained.

Figure 2:
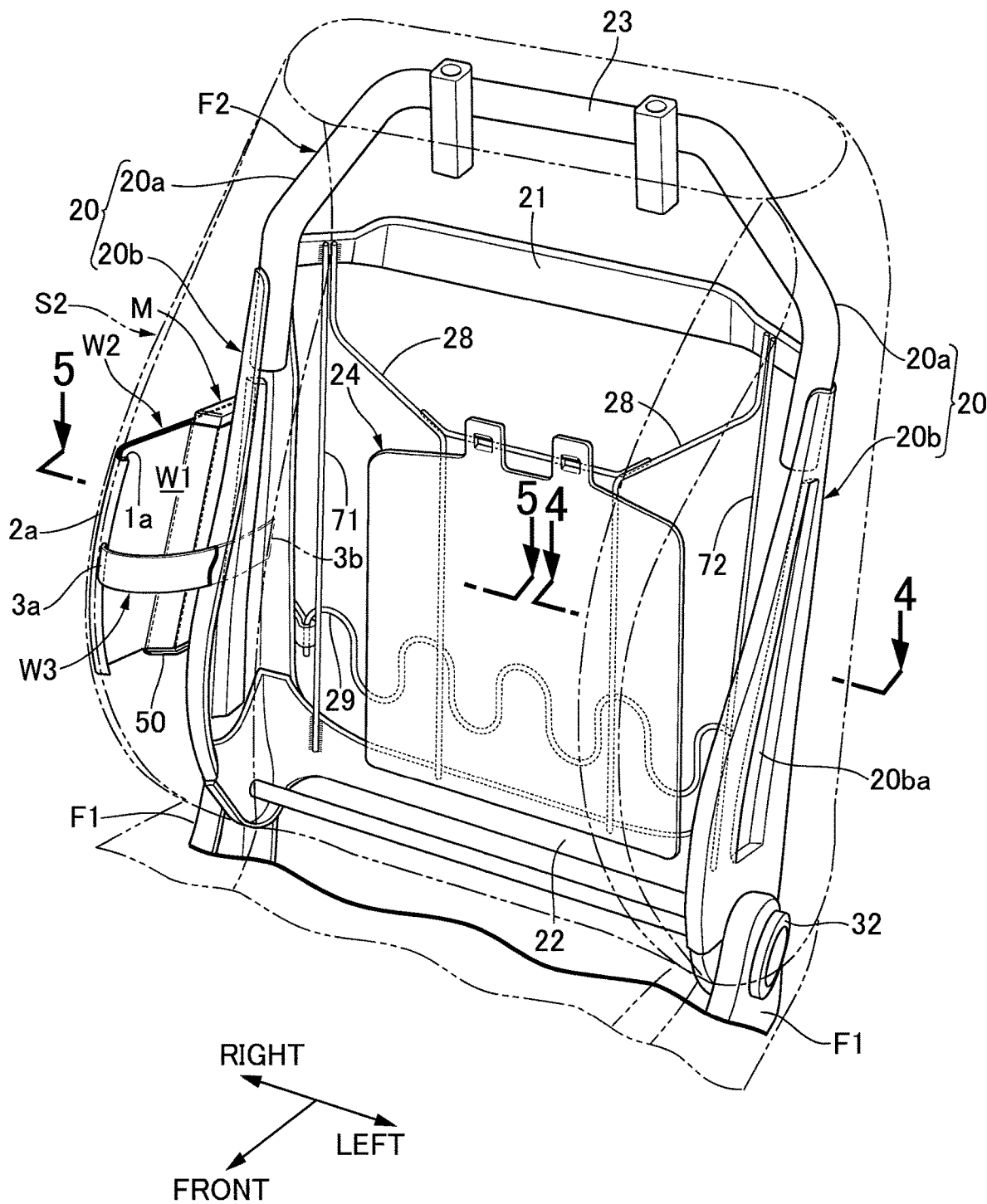
FIG. 2 is a perspective view showing a state in which, in a seat back, a back pad is detached and a back frame is exposed.

The back frame F2, which is a skeleton frame for the seat back S2, is formed as shown in FIG. 2 from a metal frame that includes a pair of left and right side frames 20 extending in the up-down direction, upper and lower cross members 21, 22 extending in the left-right direction and providing a connection between upper parts and between lower parts of the two side frames 20, and a headrest support frame part 23 providing an integral connection between upper ends of the side frames 20. The back frame F2 is one example of the frame.

Frame upper parts 20a of the left and right side frames 20 and the headrest support frame 23 are formed into an inverted U shape using a continuous pipe material. Each of the side frames 20 includes a frame upper part 20a formed from part of the pipe material, and a plate-shaped frame main portion 20b having the frame upper part 20a joined (for example welded) to its upper end part and extending in the up-down direction. The frame main portion 20b is formed from a channel member having a squared U-shaped cross section opening on the seat center side, and this channel member is formed so as to gradually increase in width in the fore-aft direction and increase in rigidity and strength in going closer to a part joined to the sitting part frame F1 (that is, a lower end part).

Integrally molded with an intermediate part in the width direction of the frame main portion 20b is a concavely curved portion 20ba that is recessed to one side (in the present embodiment inward of the seat) in the thickness direction, that is, the left-right direction, and extends in the up-down direction. The concavely curved portion 20ba exhibits a reinforcing rib effect, thus enhancing the rigidity and strength of the frame main portion 20b (and therefore the side frame 20).

A pressure-receiving plate 24 made of a synthetic resin or metal is bridged and supported between the upper and lower cross members 21, 22 of the back frame F2 via a pair of left and right wires 28 crossing between the two cross members 21, 22. Furthermore, at least one wave-shaped spring 29 supporting a back face close to a lower part of the pressure-receiving plate 24 is stretched and supported between the left and right side frames 20. The pressure-receiving plate 24, the wave-shaped spring 29, and the wire 28 support, in cooperation with each other, the back pad P (in particular a middle pad part Pc) from the reverse face side.

The structure of the back pad P is now explained. The back pad P is formed into a predetermined shape from a padding material (for example a relatively hard urethane foam), and integrally includes for example the middle pad part Pc whose front face is a face supporting the back of an occupant, and left and right bolster pad parts Ps that are connected to left and right sides respectively of the middle pad part Pc, protrude further forward than the middle pad part Pc, and support outer sides of the back, the reverse face side of each of the left and right bolster pad parts Ps being supported by the left and right side frames 20 respectively (see FIG. 4 and FIG. 5). Each of the left and right bolster pad parts Ps covers front and rear end faces and an outer face of each side frame 20.

Figure 5:
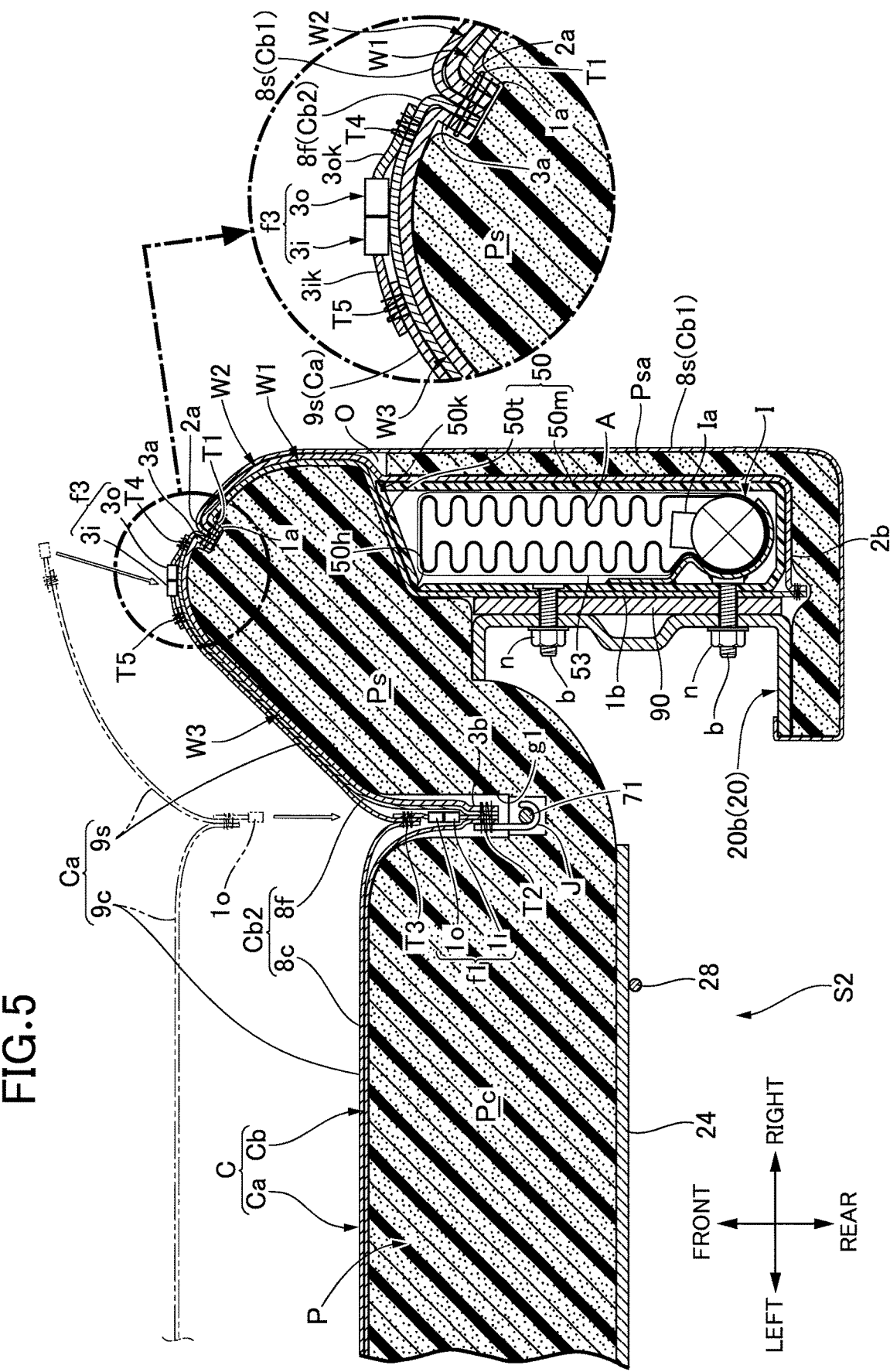
FIG. 5 is an enlarged sectional view along line 5-5 in FIG. 2.

An airbag module M is placed in the interior of the bolster pad part Ps of one, on the door side in particular, of the left and right bolster pad parts Ps (for example, on the right-hand side in the present embodiment). That is, a module housing space 60 is provided in the bolster pad part Ps on the door side, and a squared U-shaped slit O for module mounting is formed as shown in FIG. 3A and FIG. 5 in a pad portion Psa, covering the outside of the module housing space 60, of the bolster pad part Ps; the airbag module M can be fitted into the module housing space 60 by, for example, elastically deforming the pad portion Psa bounded by the slit O so as to turn it back. In such a fitted-in state the airbag module M is fixed to an outside face of the frame main portion 20b of the side frame 20.

The airbag module M includes, as is clear from FIGS. 3A and 3B and FIG. 5, a module case 50 extending along the outside face of the frame main portion 20b and having a box shape that is flat in the vehicle width direction, an inflator I retracted into and fixed to a rear part of the interior of the module case 50, an airbag A capable of being rapidly expanded toward the front side of the vehicle by high pressure gas from the inflator I, and a retaining bag 53 retaining the airbag A in a folded state at a normal time, the inflator I being capable of supplying the high pressure gas into the airbag A by operating based on a detection signal of a collision sensor (not illustrated) that can detect an impact when the vehicle is involved in a collision.

The inflator I has, on a front face of its tubular inflator case extending in the up-down direction, a high pressure gas-blowing out hole Ia opening so as to face forward, the high pressure gas-blowing out hole Ia blowing out high pressure gas substantially toward the front side of the vehicle into the airbag A. The retaining bag 53 has a thickness and strength that enables it to be broken quickly by expansion of the airbag A.

The module case 50 includes a flat box-shaped case main body 50m opening toward the front side of the vehicle and a cover plate 50t opening and closing the front end opening of the case main body 50m. A flat inner wall of the case main body 50m is fixed to the frame main portion 20b together with a base portion 1b of an inner webbing W1, which is described later, by a plurality of sets of bolts b and nuts n. The bolt b of the present embodiment is a stud bolt whose head part is fixed to the case main body 50m, but the bolt b is not limited to a stud bolt and may be any bolt that has a structure enabling at least the inner wall of the case main body 50m to be fixed to the frame main portion 20b together with the base portion 1b of the inner webbing W1.

The cover plate 50t is formed into a strip shape that is long in the up-down direction, and an inner edge thereof on the side frame 20 side is swingably linked to the opening edge of the case main body 50m via a pivot support link 50h. An outer edge of the cover plate 50t is detachably engaged with the opening edge of the case main body 50m in a state in which the cover plate 50t closes the opening of the case main body 50m. Such an engagement portion 50k is formed as a concavo-convex engagement structure whose engagement can easily be released by expansion of the airbag A so as to automatically open the cover plate 50t.

The inner webbing W1 is formed from a non-stretchable fabric material formed into a rectangular shape, and its extremity side extends forward along a side face of the bolster pad part Ps while bending between the side face of the bolster pad part Ps and an inside face and a front end face of the module case 50. A reinforcing plate 90 is joined and fixed (for example adhered) to one face (that is, a side face on the side opposite to the module case 50) of the base portion 1b of the inner webbing W1, thus enhancing the rigidity and strength of the base portion 1b (and consequently the strength with which it is joined to the side frame 20). The reinforcing plate 90 can be omitted as appropriate.

Furthermore, a base portion 2b of an outer webbing W2 formed from a non-stretchable fabric material formed into a rectangular shape is bound (for example sewn) to a base end (that is, the rear end of the base portion 1b) of the inner webbing W1. An intermediate part of the outer webbing W2 extends forward so as to follow a rear end face and an outside face of the module case 50. The structure via which the base portions 2b, 1b of the outer webbing W2 and the inner webbing W1 are sewn as shown in the present embodiment is conventionally known and is clearly illustrated in for example FIG. 29 of International Publication No. WO2017/56521A1. The base portion 2b of the outer webbing W2 may be fixed to the side frame 20 without the inner webbing W1 being involved.

The inner webbing W1 and the outer webbing W2 wrap the module case 50 so as to sandwich it from the left and right on the base part side; they are in direct contact with each other on the extremity side and extend forward along the side face of the bolster pad part Ps, and these extending end parts, that is, extremity portions 1a, 2a, are sewn together via a sewn part T1, which is described later.

A pair of left and right first and second pulling-in grooves g1, g2 extending in the up-down direction are recessed in a front face of the back pad P on a border part between the middle pad part Pc and the left and right bolster pad parts Ps respectively as shown in FIG. 3A also. Furthermore, a pair of left and right insert wires 71, 72 as support members are fixed (more specifically, integrally embedded) to the back pad P, the insert wires 71, 72 extending in the up-down direction (that is, a direction along each pulling-in groove g1, g2) so as to have part thereof exposed to a bottom face of the respective pulling-in grooves g1, g2. The insert wires 71, 72 are fixed and integrated with the back pad P by insertion molding in the present embodiment.

In addition to or instead of the insert wires 71, 72 being fixed to the back pad P by insertion molding, the insert wires 71, 72 may be fixed and supported on the back frame F2 (for example the side frame 20) directly or indirectly (for example via the wire 28, the spring 29, or the pressure-receiving plate 24).

The back pad outer skin C includes a base skin Cb retained by the back frame F2 or the back pad P and an easily removable skin Ca detachably linked to the base skin Cb. The easily removable skin Ca is one example of the cover skin detachably mounted on the seat back S. Specific examples of the base skin Cb and the easily removable skin Ca are now explained in sequence.

First, the base skin Cb includes, so as to correspond to the shape of the back pad P, a middle-side front face base skin portion 8c covering a front face of the middle pad part Pc, a front face base skin portion 8f and a side face base skin portion 8s covering a front face and a side face (including a rear face connected to the side face) respectively of the left and right bolster pad parts Ps, and an upper face base skin portion 8z covering an upper face of the back pad P. Mutually adjacent end parts of the base skin portions 8c, 8f, 8s, 8z are superimposed on one another on the reverse side of the base skin Cb and sewn with a sewing thread. The base skin Cb is thereby integrated into a bag shape overall and covers the outer surface of the back pad P.

Figure 4:
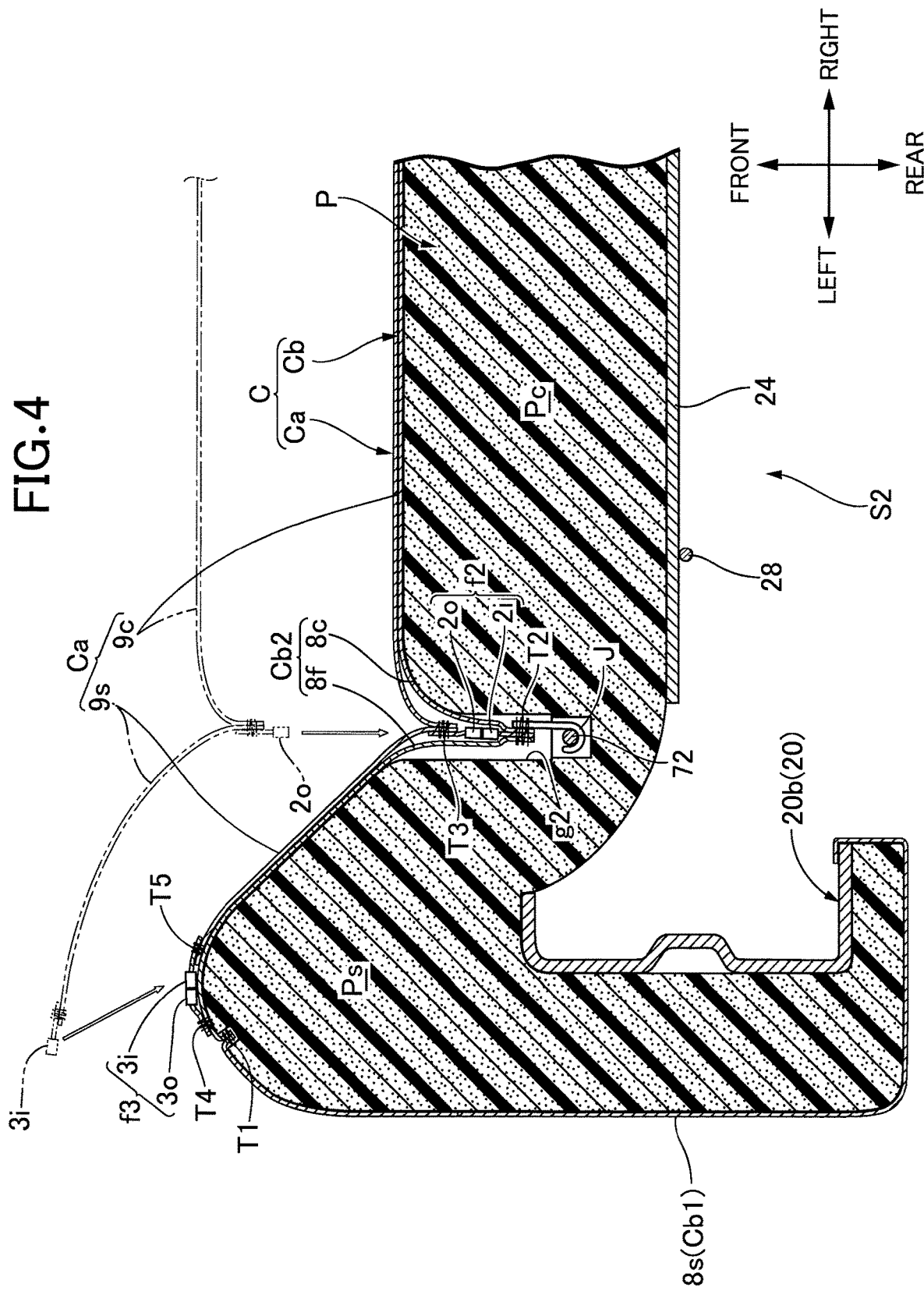
FIG. 4 is an enlarged sectional view along line 4-4 in FIG. 2.

A rear end part of the side face base skin portion 8s is as shown in FIG. 4 and FIG. 5 fixed (for example adhered) to the left and right bolster pad parts Ps and the side frame 20 so as to be wrapped around the respective rear end faces thereof. The upper face base skin portion 8z is also fixed (for example adhered) to the middle pad part Pc so as to be wrapped around the rear end face thereof. A portion of the back face of the seat back S2 that is not covered by the seat back outer skin C is neatly covered by fitting a cover member, which is not illustrated, to the back face of the seat back S2.

The upper face base skin portion 8z and the left and right side face base skin portions 8s sandwiching it from the left and right form in cooperation with each other the first base skin portion Cb1. The middle-side front face base skin portion 8c and the bolster-side front face base skin portion 8f form in cooperation with each other the second base skin portion Cb2. Adjacent end parts of the first and second base skin portions Cb1, cb2 are sewn to each other by a sewn part T1 that extends lengthwise along the adjacent end parts.

In the first embodiment and second to fourth embodiments, which are described later, the first base skin portion Cb1 forms a first portion (that is, a first portion covering the surface of a part including the side face of the bolster pad part Ps) of the seat back outer skin C. The second base skin portion Cb2 forms a second portion (that is, a second portion covering another surface that is different from said part of the surface of the bolster pad part Ps) of the seat back outer skin C.

Adjacent end parts of the side face base skin portion 8s and the front face base skin portion 8f corresponding to the bolster pad part Ps on the door side (on the right-hand side in the present embodiment) in particular are sewn (i.e. bound) to each other with a common sewing thread together with extremity portions 1a, 2a of the inner webbing W1 and the outer webbing W2 and an extremity portion 3a of a bolster webbing W3, which is described later, and the sewn part T1 becomes a starting part for breaking (a so-called tear line) when the airbag A expands. The sewn part T1 (that is, the bound part) is set so as to have a degree of sewn strength so that it is broken by the expansive force of the airbag A attempting to expand forward on the side of the bolster pad part Ps when the airbag A is in an initial stage of expansion as described later.

In the present embodiment, the sewn part T1 is disposed as shown in FIG. 4 and FIG. 5 so as to go along the border part between the front face and the side face of the bolster pad part Ps or the vicinity thereof.

Adjacent end parts of the middle-side front face base skin portion 8c and the left and right bolster-side front face base skin portions 8f forming the second base skin portion Cb2 are sewn to each other. This sewn part T2 (that is, the bound part) is pulled into the first and second pulling-in grooves g1, g2, and the pulled-in parts are latched and fixed to the respective insert wires 71, 72 via a plurality of pulling-in members J. That is, front end parts of the plurality of pulling-in members J extending in the fore-aft direction in a hook shape are bound (sewn) together to the sewn part T2, and rear end hook parts of the pulling-in members J are latched onto the insert wires 71, 72 within the first and second pulling-in grooves g1, g2.

On the other hand, the easily removable skin Ca includes left and right side part removable skin portions 9s covering at least part (a majority in the present embodiment) of the front face of the bolster pad part Ps and a middle part removable skin portion 9c covering the front face of the middle pad part Pc. Adjacent end parts of the left and right side part removable skin portion 9s and the middle part removable skin portion 9c are pulled into the first and second pulling-in grooves g1, g2 and sewn via a sewn part T3 (that is, the bound part) within the groove.

The easily removable skin Ca is detachably connected to the second base skin portion Cb2 of the base skin Cb via first and second fasteners f1, f2 within the first and second pulling-in grooves g1, g2 respectively. Furthermore, an outer peripheral edge of the easily removable skin Ca is detachably connected to the second base skin portion Cb2 via a third fastener f3.

In the present embodiment, the first to third fasteners f1 to f3 have the same structure as that of a conventionally known slide fastener, and include pairs of inner and outer fastener half bodies 1i, 1o to 3i, 3o, and knob-equipped sliders 1s to 3s that can open and close the gap between the pair of inner and outer fastener half bodies 1i, 1o to 3i, 3o. Each of the fastener half bodies 1i, 1o to 3i, 3o has a band-shaped base fabric extending in the longitudinal direction and a large number of tooth parts provided along one side edge of the base fabric (adjacent end edges of the two base fabrics), and the base fabric functions as a mounting piece part, mounted on an adjacent member, of each of the fastener half bodies 1i, 1o to 3i, 3o. The tooth parts of the two base fabrics are disengageably latched onto each other by the sliders is to 3s, which can slide against the tooth parts. The fastener function is the same as that of a conventionally known slide type line fastener.

The base fabrics of the inner fastener half bodies 1i, 2i of the first and second fasteners f1, f2 are sewn to the sewn part T2 between the middle-side front face base skin portion 8c and the bolster-side front face base skin portion 8f of the second base skin portion Cb2 within the corresponding pulling-in grooves g1, g2. On the other hand, the base fabrics of the outer fastener half bodies 1o, 2o of the first and second fasteners f1, f2 are sewn to the sewn part T3 between the side part removable skin portion 9s and the middle part removable skin portion 9c of the easily removable skin Ca within the corresponding pulling-in grooves g1, g2.

A base fabric 3ok (that is, a mounting piece part), extending on the first base skin portion Cb1 side, of the outer fastener half body 3o of the third fastener f3 disposed so as to follow the sewn part T1 is sewn with sewing T4 to the outer peripheral edge of the second base skin portion Cb2, and a base fabric 3ik of the inner fastener half body 3i of the third fastener f3 is sewn with sewing T5 to the outer peripheral edge of the easily removable skin Ca.

Disposed on the reverse side of a specific outer skin portion (more specifically, the bolster-side front face base skin portion 8f of the second base skin portion Cb2), covering the front face of the bolster pad part Ps on the door side further on the middle pad part Pc side than the sewn part T1, of the back pad outer skin C is the non-stretchable bolster webbing W3, which suppresses stretching of the specific outer skin portion 8f toward the door side by the expansive force of the airbag A in the initial stage of expansion. The bolster webbing W3 is one example of the cloth member and the stretch-suppressing webbing.

At least the bolster-side front face base skin portion 8f of the second base skin portion Cb2 (the entirety in the present embodiment) and at least the side part removable skin portion 9s of the easily removable skin Ca (the entirety in the present embodiment) are formed from a stretchable sheet-shaped material (for example a fabric material). The stretchability is set such that, if the bolster webbing W3 were not provided, the bolster-side front face base skin portion 8f and the side part removable skin portion 9s would stretch toward the door side in response to forward expansion of the airbag A in the initial stage of expansion (that is, by the expansive force of the airbag A toward the door side).

The airbag A placed in the interior of the bolster pad part Ps on the door side makes engagement of the engagement portion 50k be automatically released by the expansive force thereof in the initial stage of expansion and makes the cover plate 50t open and swing (that is, swing forward around a part of the pivot support link 50h at the inner end). The airbag A in the initial stage of expansion thereby expands toward the front side of the vehicle through a gap (see FIG. 6A) formed between the cover plate 50t and the front end opening of the case main body 50m, and further expands forward between the outside face of the bolster pad part Ps and the side face base skin 8s.

In accordance with expansion of such an airbag A in an initial stage of expansion, the sewn part T1 between the first and second base skin portions Cb1, Cb2 of the seat back outer skin C is broken by the expansive force of the airbag A toward the door side. In this case, the airbag A expands and is deployed substantially toward the front side of the vehicle through the broken section of the sewn part T1, and in order to appropriately control the deployment direction in this process, a plurality of non-stretchable webbings (that is, the inner webbing W1 and outer webbing W2 as expansive pressure transmitting webbings and the bolster webbing W3 as a stretch-suppressing webbing) are disposed on the bolster pad part Ps on the door side in the present embodiment.

The main purpose of the inner webbing W1 and the outer webbing W2 is to receive the expansive force of the airbag A when the airbag A is in the initial stage of expansion and transmit it to the sewn part T1, thus allowing the sewn part T1 to be efficiently broken by the expansive force of the airbag A, and the inner webbing W1 and the outer webbing W2 are one example of the expansive force transmission webbing. The extremity portions 1a, 2a of the webbings W1, W2 are sewn together with the mutually adjacent end parts of the bolster-side front face base skin portion 8f and the side face base skin portion 8s as described above, and the sewn part T1 is broken, via the inner webbing W1 and the outer webbing W2, by receiving the expansive force of the airbag A attempting to expand forward on the side of the bolster pad part Ps when the airbag A is in the initial stage of expansion.

Furthermore, the inner webbing W1 and the outer webbing W2 are formed so as to have a vertical width that is substantially the same as or greater than the vertical width of the airbag module M from the base portions 1b, 2b to the extremity portions 1a, 2a (that is, it is formed into a substantially rectangular shape in a deployed state).

On the other hand, the bolster webbing W3 is a webbing whose main purpose is to suppress stretching of the front face base skin portion 8f in the lateral direction, that is, toward the door side, by the expansive force of the airbag A in the initial stage of expansion, and the base portion 3b thereof is sewn with the pulling-in member J, etc. via the sewn part T2 within the pulling-in groove g1 on the door side. Therefore, the base portion 3b of the bolster webbing W3 is latched and fixed to the side frame 20 or the back pad P via the pulling-in member J and the insert wires 71, 72 by making the pulling-in member J latch onto the insert wires 71, 72. The pulling-in member J and the insert wire 71 form a fixing part via which the base portion 3b of the bolster webbing W3 is fixed to the back pad P or the side frame 20.

The extremity portion 3a of the bolster webbing W3 is sewn via the sewn part T1 as described above (that is, sewn with a common sewing thread together with mutually adjacent end parts of the bolster-side front face base skin portion 8f and the middle-side side face base skin portion 8s and the extremity portions 1a, 2a of the inner webbing W1 and the outer webbing W2). Furthermore, an intermediate part of the bolster webbing W3 is disposed so as to extend along the front face of the bolster pad part Ps on the door side and transect the front face and so as to overlap the reverse face of the bolster-side front face base skin portion 8f.

The bolster webbing W3 is formed so as to have a width in the up-down direction that is smaller than the base portion 3b of the extremity portion 3a and smaller than the inner webbing W1 and the outer webbing W2. In particular, the bolster webbing W3 of the present embodiment is formed into a strip shape having a width in the up-down direction that is smaller than the inner webbing W1 and the outer webbing W2. Moreover, the extremity portion 3a, bound by the sewn part T1, of the bolster webbing W3 is as shown in FIG. 3A and FIG. 5 disposed at substantially the same height as the high pressure gas-blowing out hole Ia, opening on the front side of the vehicle, of the inflator I.

The operation of the first embodiment is now explained by reference in addition to FIGS. 6A to 6C. FIG. 5 shows the state of the bolster pad part Ps of the seat back S2 at a normal time (that is, at a time when the airbag A is not being operated).

In the event of the automobile being involved in a collision, in the airbag module M placed in the interior of the back pad P, the inflator I is operated based on a signal from a sensor, which is not illustrated, that senses an impact at the time of the collision, high pressure gas is supplied to the airbag A, and the airbag A thereby attempts to rapidly expand and be deployed toward the front side of the vehicle.

Figure 6:
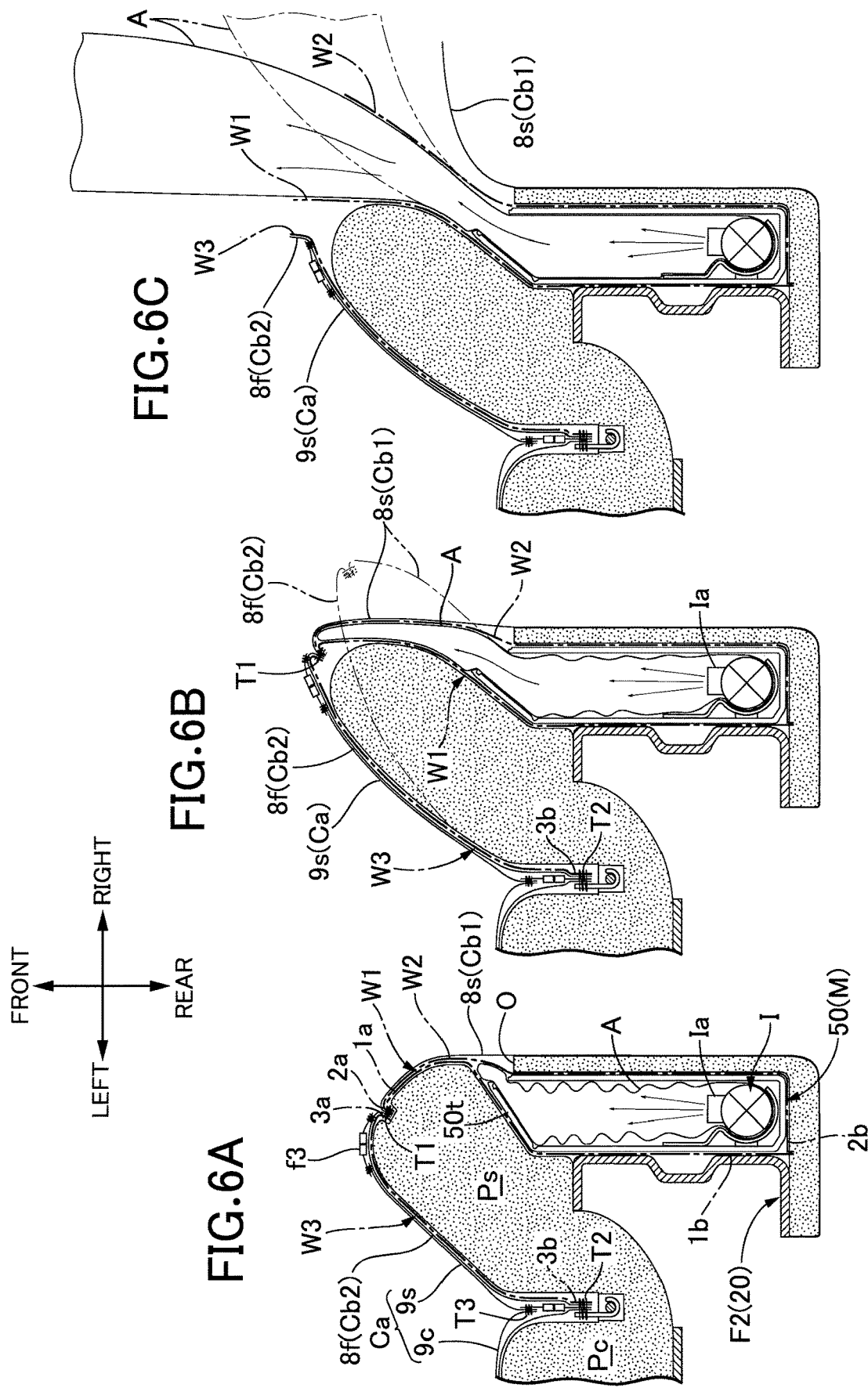
FIGS. 6A, 6B, and 6C are views, corresponding to FIG. 5, schematically showing an airbag expansion deployment process, FIG. 6A showing a state immediately after a lid of a module case has started to open due to the airbag starting to expand, FIG. 6B showing a state immediately before a sewn part breaks after the airbag expansion progresses to the side of a bolster pad part, and FIG. 6C showing a state in which the sewn part has broken and the airbag expands and is deployed toward the front side of the vehicle.

In such an initial stage of expansion of the airbag A, as schematically shown in FIG. 6A→FIG. 6B, the airbag A makes the cover plate 50t of the module case 50 open, that is, swing forward, it expands forward through a gap formed between the cover plate 50t and the open end of the case main body 50m, that is, into a gap between the inner webbing W1 and the outer webbing W2 (and, therefore, the side face base skin portion 8s), and it attempts to expand forward while pushing and widening the gap. In this process, the expansive force of the airbag A is received by the inner webbing W1 and the outer webbing W2 to the side of the bolster pad part Ps in particular and transmitted from the webbings W1, W2 to the sewn part T1. Because of this, the expansive force of the airbag A attempts to draw the sewn part T1 or the base skin Cb connected thereto (in particular, the bolster-side front face base skin portion 8f) and the easily removable skin Ca (in particular, the side part removable skin portion 9s) toward the door side, but the force is firmly received by the non-stretchable bolster webbing W3.

Therefore, although a specific outer skin portion (for example the bolster-side front face base skin portion 8f or the side part removable skin portion 9s) of the back pad outer skin C is formed from an easily stretchable material, the sewn part T1 is quickly broken at a proper position that is not greatly displaced toward the door side, and the specific outer skin portions 8f, 9s are promptly detached away from the side face base skin portion 8s. In this way, since the airbag A expands and is deployed all at once substantially toward the front side of the vehicle (see FIG. 6C), the deployed airbag A can appropriately protect any of a head part, a chest part, and a lumbar region of an occupant.

In the embodiment, if the bolster webbing W3 were omitted, when the expansive force toward the door side of the airbag A in the initial stage of expansion was transmitted to the sewn part T1, the expansive force would cause the specific outer skin portions 8f, 9s to stretch toward the door side and, together with the stretching, the sewn part T1 would be broken in a state in which it had been moved toward the door side by a considerable amount (see the double-dotted broken line in FIG. 6B). Because of this, the airbag A would be deployed obliquely forward so as to be close to the door (see the double-dotted broken line in FIG. 6C), and it would not have a structure that would be advantageous in terms of appropriately protecting any of a head part, a chest part, and a lumbar region of an occupant.

Furthermore, in the present embodiment, since the outer webbing W2 is provided as an expansive force transmission webbing in addition to the inner webbing W1, the expansive force toward the door side of the airbag A can be quickly and efficiently made to act on the sewn part T1, and the sewn part T1 can be quickly and appropriately broken, thereby suppressing further effectively expansion and deployment of the airbag A obliquely forward and close to the door.

In the seat S of the present embodiment explained above, mutually adjacent end parts of the first and second base skin portions Cb1, Cb2 of the back pad outer skin C are sewn with sewing T1 together with the extremity portions 1a, 2a of the inner webbing W1 and the outer webbing W2 as expansive force transmission webbings in the bolster pad part Ps on the door side, and the expansive force of the airbag A attempting to expand forward on the side of the bolster pad part Ps when the airbag A is in the initial stage of expansion is transmitted to the sewn part T1 via the inner webbing W1 and the outer webbing W2, thus breaking it and enabling the airbag A to be deployed forward.

In such a seat S, the non-stretchable bolster webbing W3 is disposed on the reverse side of the specific outer skin portion (that is, the bolster-side front face base skin portion 8f, or the side part removable skin portion 9s superimposed thereon), covering the front face of the bolster pad part Ps further on the middle pad part Pc side than the sewn part T1, of the back pad outer skin C, the non-stretchable bolster webbing W3 suppressing stretching of the specific outer skin portions 8f, 9s toward the door side by the expansive force of the airbag A in the initial stage of expansion.

This enables the specific outer skin portions 8f, 9s to be prevented effectively by the non-stretchable bolster webbing W3 from being stretched toward the door side by the expansive force of the airbag A in the initial stage of expansion of the airbag A even when the specific outer skin portions 8f, 9s are formed from an easily stretchable material, displacement of the sewn part T1 toward the door side is minimized, and it is broken at a proper position. In this way, the airbag A can be expanded and deployed substantially toward the front side of the automobile, and any of a head part, a chest part, and a lumbar region of an occupant can be appropriately protected.

Since the bolster-side front face base skin portion 8f of the second base skin portion Cb2 forming the specific outer skin portion is disposed so as to overlap the reverse face of the easily removable skin Ca (the side part removable skin portion 9s), the second base skin portion Cb2 (8f) can neatly cover not only the front face of the bolster pad part Ps but also the bolster webbing W3 even when the easily removable skin Ca is removed from the second base skin portion Cb2.

With regard to the bolster webbing W3 of the present embodiment, the base portion 3b is latched and fixed via the pulling-in member J to the insert wire 71 embedded and integrated with the back pad P, the extremity portion 3a is sewn to the sewn part T1, and an intermediate part of the bolster webbing W3 is disposed so as to transect the front face of the bolster pad part Ps on the door side and be superimposed on the reverse face of the specific outer skin portions 8f, 9s. This enables the bolster webbing W3 to be easily disposed between the reverse faces of the specific outer skin portions 8f, 9s and the front face of the bolster pad part Ps without problems.

In particular, since the inner webbing W1 and the outer webbing W2 are formed so as to have a vertical width that is substantially the same as or greater than the vertical width of the airbag module M from the base portions 1b, 2b to the extremity portions 1a, 2a, the expansive force of the airbag A in the initial stage of expansion of the airbag A can be received effectively by the wide inner webbing W1 and outer webbing W2. This enables the sewn part T1 to be efficiently broken by the expansive force of the airbag A, and at the same time the side face of the bolster pad part Ps can be protected effectively by the inner webbing W1.

On the other hand, the bolster webbing W3 has the extremity portion 3a formed so as to have a width that is smaller in the up-down direction than those of the inner webbing W1 and the outer webbing W2. This enables the bolster webbing W3 itself to be made small and consequently the cost to be reduced while suppressing, by the bolster webbing W3, stretching toward the door side of the front face base skin portion 8f caused by the expansive force of the airbag A in the initial stage of expansion of the airbag A. In this case, since the bolster webbing W3 is formed into a strip shape having a width that is smaller in the up-down direction than those of the inner webbing W1 and the outer webbing W2 in the present embodiment, it is possible to minimize the dimensions of the bolster webbing W3 itself, thus further reducing the cost.

In the present embodiment, the sewn part T1 between the extremity portions 1a to 3a of the webbings W1 to W3, the front face base skin portion 8f, and the side face base skin portion 8s is disposed at substantially the same height as that of the high pressure gas-blowing out hole Ia, opening toward the front side of the vehicle, of the inflator I. This enables not only the flow of high pressure gas blowing out from the high pressure gas-blowing out hole Ia to be concentrated on a region of part of the sewn part T1 but also for the narrow extremity portion 3a of the bolster webbing W3 to be joined to the sewn part T1 at a position corresponding to the concentrated part, and the extremity portion 3a can efficiently and appropriately exhibit a stretch-suppressing effect toward the front face base skin portion 8f even when the bolster webbing W3 has a small width (and consequently a relatively small size).

In the present embodiment, the sewn part T1 is disposed so as to go along a border part between the front face and the side face of the bolster pad part Ps on the door side or the vicinity thereof. This enables the bolster webbing W3 to be made as short as possible in a direction transecting the front face of the bolster pad part Ps, the bolster webbing W3 quickly attains a taut state in the initial stage of expansion of the airbag A, and a stretch-suppressing effect can be exhibited quickly and appropriately toward the front face base skin portion 8f.

Furthermore, in the present embodiment, the pulling-in member J for pulling in the second base skin portion Cb2 or the easily removable skin Cb1 of the seat back outer skin C into the pulling-in groove Ph between the bolster pad part Ps and the middle pad part Pc is mounted on the insert wires 71, 72 embedded in and integrated with the seat back P, and the base portion 3b of the bolster webbing W3 is fixed to the pulling-in member J. This enables the pulling-in member J for pulling in the seat back outer skin C and the insert wires 71, 72 connected thereto to be used as fixing and support means for the base portion 3b of the bolster webbing W3, thus achieving simplification of the structure.

Figure 7:
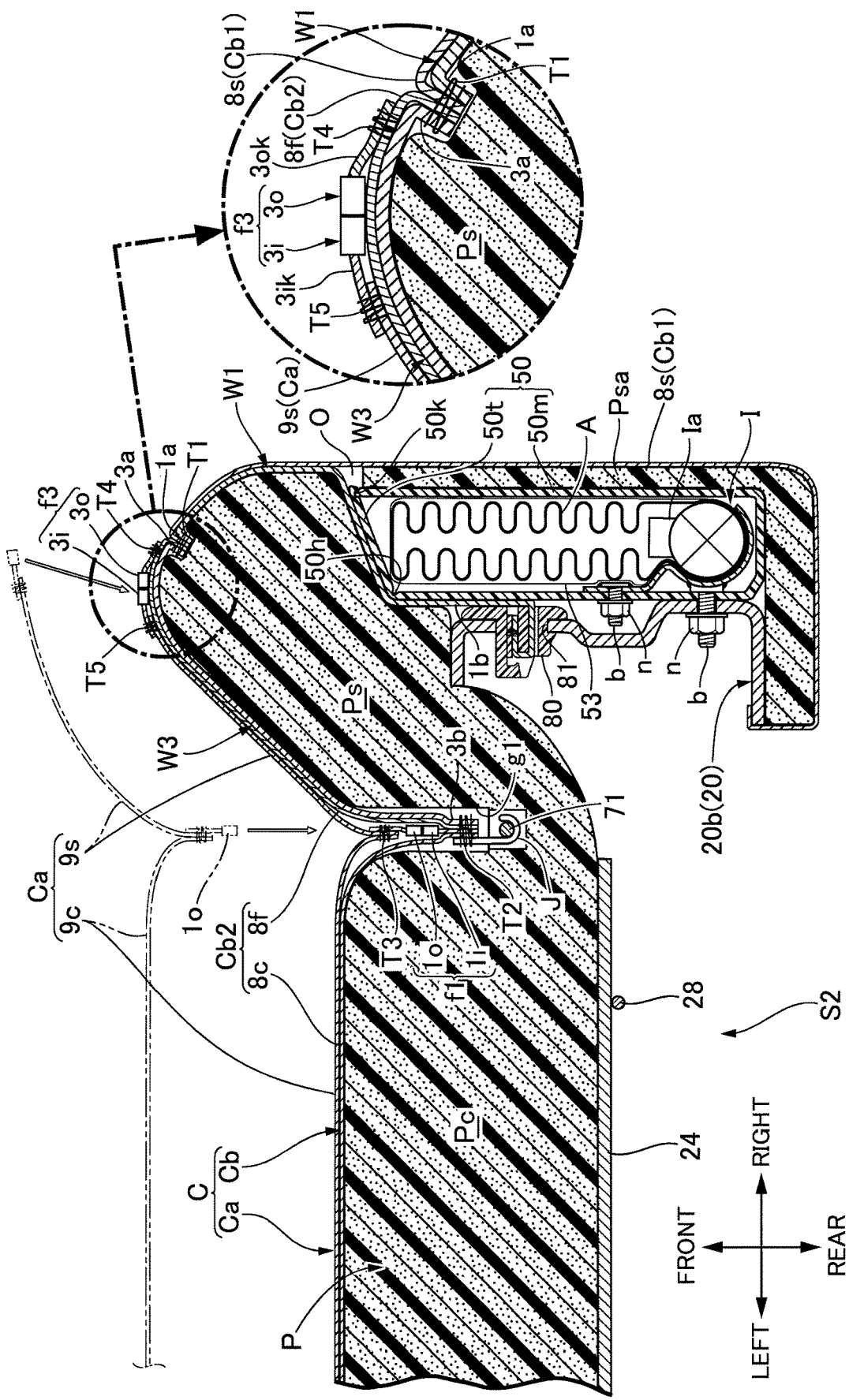
FIG. 7 is a sectional view, corresponding to FIG. 5, showing a second embodiment of the present invention.

FIG. 7 shows a second embodiment of the present invention. Although the first embodiment illustrates a case in which the base portion 1b of the inner webbing W1 is fixed to the back frame F2 (the side frame 20) together with the module case main body 50 by the bolt b and the nut n, in the second embodiment a latching claw-equipped clip 80, made of a synthetic resin, pre-fixed to the base portion 1b of the inner webbing W1 is made to disengageably latch onto a latching hole 81 of the back frame F2 (the side frame 20). This enables the base portion 1b of the inner webbing W1 to be easily and quickly fixed to the back frame F2 via the clip 80. The structure as in the second embodiment via which a webbing is fixed to the back frame F2 by the clip 80 is conventionally known, and it is also clearly shown in for example Japanese Patent Application Laid-open No. 2014-210475.

The first embodiment illustrates a case in which the outer webbing W2 is provided in addition to the inner webbing W1, but in the second embodiment the outer webbing W2 is omitted. The arrangement of the second embodiment is otherwise the same as that of the first embodiment; constituent elements corresponding to the constituent elements of the first embodiment are denoted by the same reference numerals and symbols, further explanation thereof being omitted.

Figure 8:
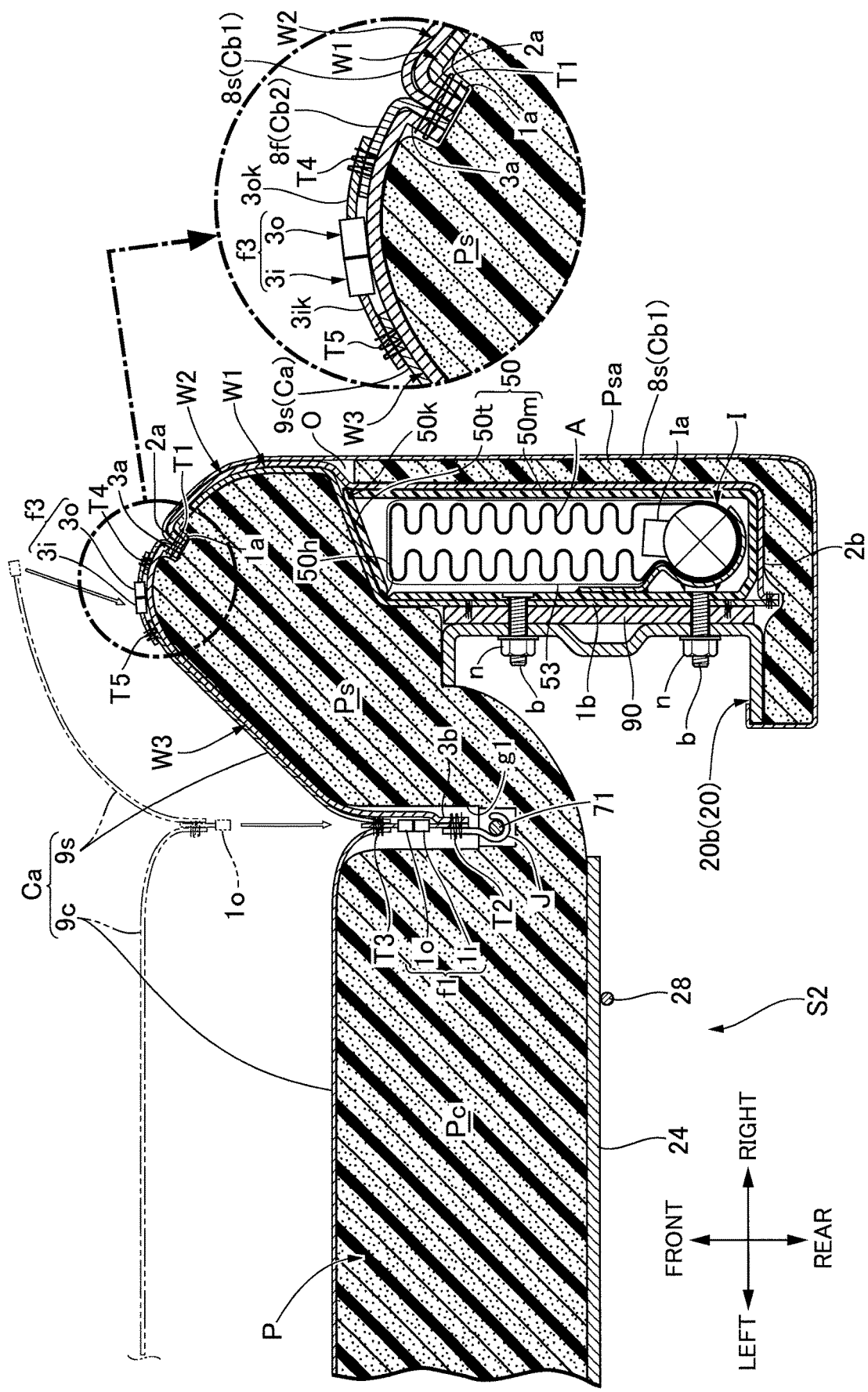
FIG. 8 is a sectional view, corresponding to FIG. 5, showing a third embodiment of the present invention

FIG. 8 shows a third embodiment of the present invention. In the first and second embodiments, the base skin Cb of the back pad outer skin C, in particular the second base skin portion Cb2, is disposed so as to overlap the reverse face of the easily removable skin Ca and directly cover the front faces of the bolster pad part Ps and the middle pad part Pc, and the front face base skin portion 8f of the second base skin portion Cb2 and the side part removable skin portion 9s of the easily removable skin Ca are specific outer skin portions whose stretching is to be suppressed by the bolster webbing W3. On the other hand, in the third embodiment the second base skin portion Cb2 is formed and disposed so as not to overlap the reverse face of the easily removable skin Ca, and the side part removable skin portion 9s of the easily removable skin Ca directly covering, without the base skin Cb (more specifically, the second base skin portion Cb2), the front face of the bolster pad part Ps on the door side forms a specific outer skin portion whose stretching is to be suppressed by the bolster webbing W3 (that is, the stretch-suppressing webbing).

That is, the third embodiment is based on the first embodiment, the second base skin portion Cb2 of the base skin Cb is formed into a small-width band fabric shape extending along the sewn part T1, and one side edge, on the middle pad part Pc side, of the second base skin portion Cb2 is detachably connected to the outer edge of the side part removable skin portion 9s of the easily removable skin Ca via the third fastener f3. The other side edge of the second base skin portion Cb2 is sewn (bound) with the front end edge of the first base skin portion Cb1 or the extremity portions 1a to 3a of the webbings W1 to W3 via the common sewn part T1 as for the second base skin portion Cb2 of the first and second embodiments.

The front or intermediate part of the first base skin portion Cb1 may be joined to the side face of the bolster pad part Ps by joining means with low joining strength (for example a hook-and-loop fastener, sewing, simple adhesion, etc.) so that it will not be detached from the bolster pad part Ps when the easily removable skin Ca is removed.

The arrangement of the third embodiment is otherwise the same as that of the first embodiment; constituent elements corresponding to the constituent elements of the first embodiment are denoted by the same reference numerals and symbols, further explanation thereof being omitted.

In accordance with the third embodiment, the same effects as those of the first embodiment can be achieved. Furthermore, although the front face of the bolster pad part Ps and the bolster webbing W3 of the third embodiment are exposed when the easily removable skin Ca is removed from the base skin Cb (that is, the second base skin portion Cb2), in a normal state of use in which the easily removable skin Ca is mounted on the base skin Cb (Cb2), they are neatly covered by the side part removable skin portion 9s of the easily removable skin Ca.

Figure 9:
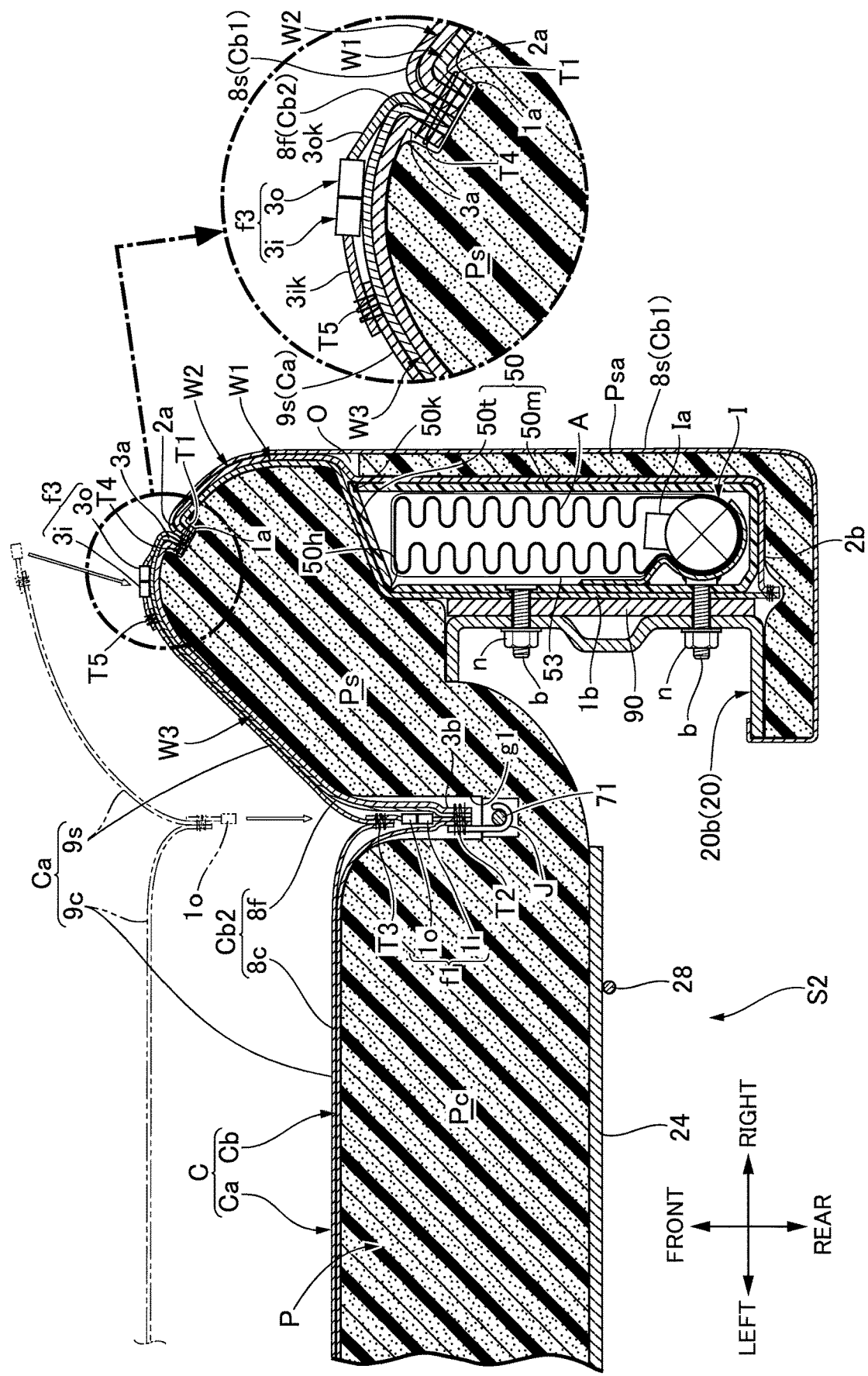
FIG. 9 is a sectional view, corresponding to FIG. 5, showing a fourth embodiment of the present invention.

FIG. 9 shows a fourth embodiment of the present invention. The first to third embodiments illustrate a case in which the base fabric 3ok of the outer fastener half body 3o of the third fastener f3 is sewn by sewing T4 to the second base skin portion Cb2 separately and independently from the sewn part T1, which is a so-called tear line of the base skin Cb. On the other hand, in the fourth embodiment, the base fabric 3ok (that is, the mounting piece part), extending on the first base skin Cb1 side, of the outer fastener half body 3o of the third fastener f3 is inserted between adjacent end parts of the first and second base skin portions Cb1, Cb2 and sewn together with the first and second base skin portions Cb1, Cb2 or the extremity portions 1a to 3a of the webbings W1 to W3 via the sewn part T1.

The arrangement of the fourth embodiment is otherwise the same as that of the first embodiment; constituent elements corresponding to the constituent elements of the first embodiment are denoted by the same reference numerals and symbols, further explanation thereof being omitted.

In accordance with the fourth embodiment, the same effects as those of the first embodiment can be achieved. Furthermore, in the fourth embodiment, stitching for mounting on the base skin Cb the base fabric 3ok of the outer fastener half body 3o functioning as a mounting piece part of the third fastener f3 functions also as a so-called tear line (that is, the sewn part T4 can be omitted) and the structure can be simplified accordingly.

FIG. 10 shows a fifth embodiment of the present invention. In the third embodiment shown in FIG. 8, the base skin Cb (more specifically, the second base skin portion Cb2) is formed into a small-width band shape so as not to overlap the reverse face of the easily removable skin Ca, and the base fabric 3ok of the outer fastener half body 3o of the third fastener f3 is sewn by sewing T4 to the second base skin portion Cb2 separately and independently from the sewn part T1, which is a tear line of the base skin Cb.

On the other hand, in the fifth embodiment, the second base skin portion Cb2 is omitted, and the base skin C is formed only from the first base skin portion Cb1. The base fabric 3ok (that is, the mounting piece part) extending on the first base skin portion Cb1 side, of the outer fastener half body 3o of the third fastener f3 is sewn together with the first base skin portion Cb1 or the extremity portions 1a to 3a of the webbings W1 to W3 via the sewn part T1. In the fifth embodiment, the base skin C forms a first portion of the back pad outer skin C, and the easily removable skin Ca as a cover skin forms a second portion of the back pad outer skin C.

The arrangement of the fifth embodiment is otherwise the same as that of the third embodiment; constituent elements corresponding to the constituent elements of the third embodiment are denoted by the same reference numerals and symbols, further explanation thereof being omitted.

In accordance with the fifth embodiment, the same effects as those of the third embodiment can be achieved. Furthermore, in the fifth embodiment, in the same manner as in the fourth embodiment, stitching for mounting on the base skin Cb the base fabric 3ok of the outer fastener half body 3o functioning as a mounting piece part of the third fastener f3 functions also as stitching that is a so-called tear line (that is, the sewn part T4 can be omitted), and the structure can be simplified accordingly.

First to fifth embodiments of the present invention are explained above, but the present invention is not limited to the above-mentioned embodiments and may be modified in a variety of ways as long as the modifications do not depart from the gist of the present invention.

For example, in the embodiments, the automobile seat S is illustrated as a vehicle seat, but it is also applicable to a seat used in a vehicle other than an automobile (for example, a railcar).

Figure 11C:
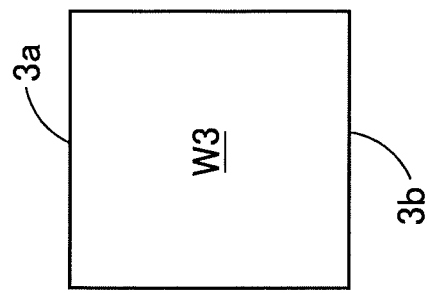
FIGS. 11A, 11B, and 11C are views of webbing development showing first to third modified examples of a bolster webbing.
Figure 11B:
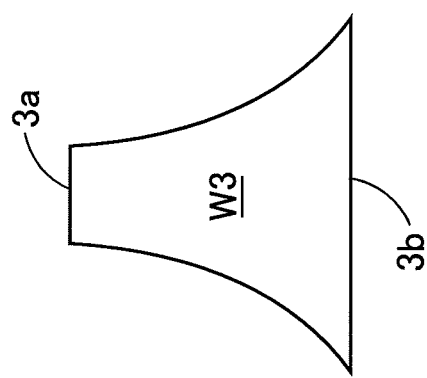
Figure 11A:
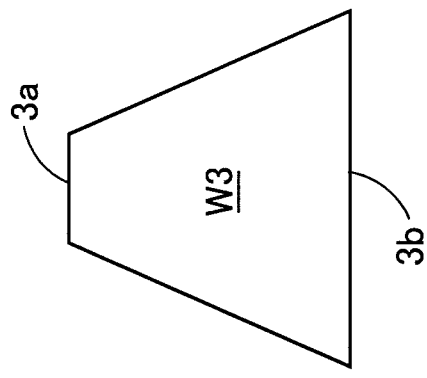

In the embodiments, one having a strip shape that is narrow in the up-down direction is illustrated as the bolster webbing W3 forming a stretch-suppressing webbing, but the bolster webbing W3 is not limited to the structure of the embodiment, for example, the bolster webbing W3 may be formed to have a width that gradually decreases in going from the base portion 3b to the extremity portion 3a as in first and second modified examples shown in FIGS. 11A and 11B, or alternatively as in a third modified example shown in FIG. 11C the bolster webbing W3 may be formed into a rectangular shape having substantially the same width from the base portion 3b to the extremity portion 3a.

Figure 12:
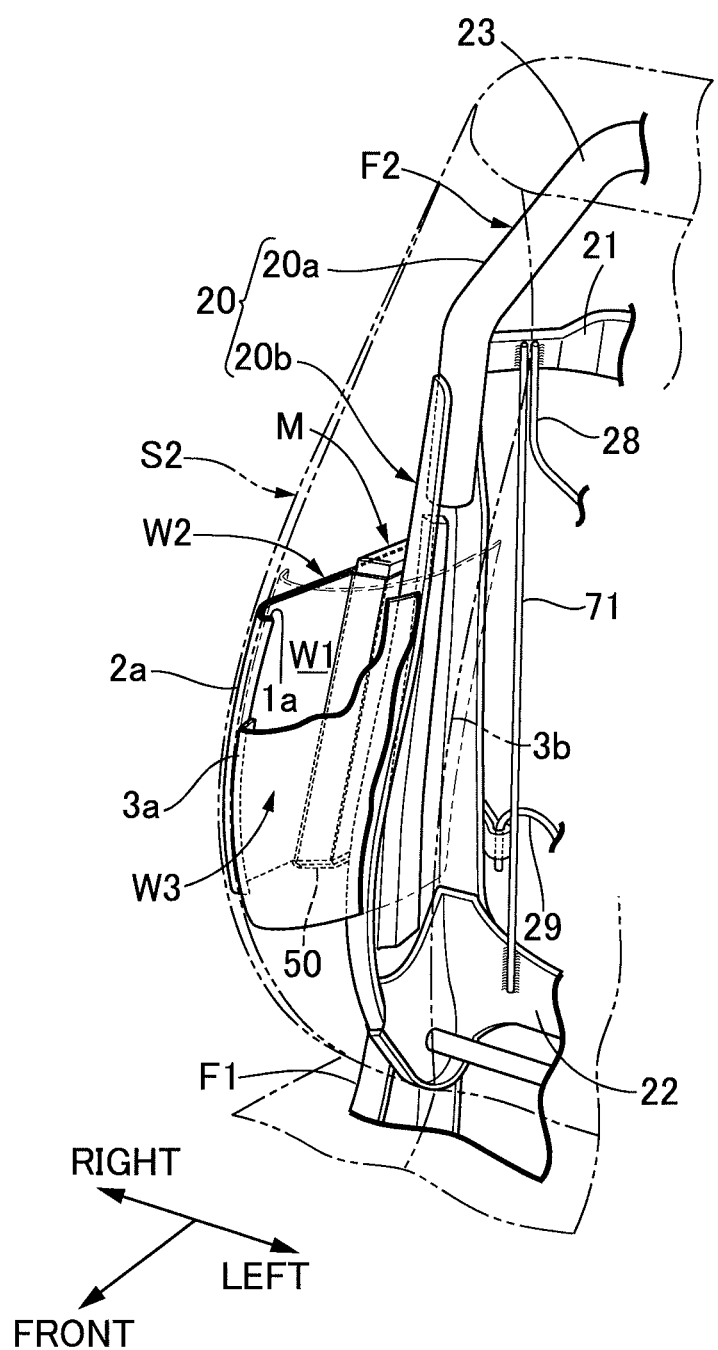
FIG. 12 is a perspective view, corresponding to FIG. 2, showing one example in which the third modified example of the bolster webbing shown in FIG. 11C is incorporated into a seat back.

FIG. 12 shows one example in which the third modified example (that is, FIG. 11C) of the bolster webbing W3 is incorporated into the seat back S2, and in the illustrated example the rectangular bolster webbing W3 is formed wide in the up-down direction so as to protrude upward and downward from the webbings W1, W2. Therefore, in the illustrated example, it can be anticipated that an effect from the vertically wide bolster webbing W3 in suppressing excessive stretching of the back pad outer skin C toward the door side by the expansive force of the airbag A before the sewn part T1 breaks when the airbag A is expanding will be exhibited effectively throughout a relatively wide range in the up-down direction of the back pad outer skin C. In the illustrated example of FIG. 12, the vertical width of the rectangular bolster webbing W3 is greater than that of the other webbings W1, W2, but it may be set to be substantially the same as that of the other webbings W1, W2 or may be narrower than that of the other webbings W1, W2.

In the embodiments, the bolster webbing W3 functioning as a stretch-suppressing webbing is illustrated as one example of the cloth member, but the cloth member may be formed from a backing material and joined (for example sewn, glued, adhered, etc.) to the reverse face of a specific outer skin portion (for example the bolster-side front face base skin portion 8f of the base skin Cb or the side part removable skin portion 9s of the easily removable skin Ca).

In the embodiments, one formed into a rectangular shape having substantially the same width as the vertical width of the module case 50 from the base portions 1b, 2b to the extremity portions 1a, 2a is illustrated as the inner webbing W1 and outer webbing W2 forming the expansive force transmission webbing, but the inner webbing W1 and the outer webbing W2 are not limited to the structure of the embodiments and may be formed into for example a rectangular shape having a width that is greater or smaller than the vertical width of the module case 50. Alternatively, in the same manner as in the first and second modified examples of the bolster webbing W3 shown in FIGS. 11A and 11B, the inner webbing W1 and the outer webbing W2 may be formed so as to have a width that gradually decreases in going from the base portions 1b, 2b to the extremity portions 1a, 2a.

The embodiments illustrate a case in which both the base skin Cb and the easily removable skin Ca of the back pad outer skin C are formed from an easily stretchable fabric material, but part of the base skin Cb (for example part of the first base skin portion Cb1 (for example the side face base skin portion 8s or the upper face base skin portion 8z) and/or part of the second base skin portion Cb2 (for example the middle-side front face base skin portion 8c)) may be formed from a material that is difficult to stretch. Alternatively, part of the easily removable skin Ca (for example the middle part removable skin portion 9c) may be formed from a material that is difficult to stretch.

The first, second, and fourth embodiments illustrate a case in which only the base portion 3b and the extremity portion 3a of the bolster webbing W3 are bound (sewn) to the second base skin portion Cb2 (the bolster-side front face base skin portion 8f) as the specific outer skin portion, but an intermediate part or the entirety of the bolster webbing W3 may be bound (for example sewn or adhered) to the reverse face of the bolster-side front face base skin portion 8f. In this case, the ease of retaining the second base skin portion Cb2 (8f) by the bolster webbing W3 is enhanced, and the effect of the bolster webbing W3 in suppressing stretching of the second base skin portion Cb2 (8f) is enhanced.

Figure 3:
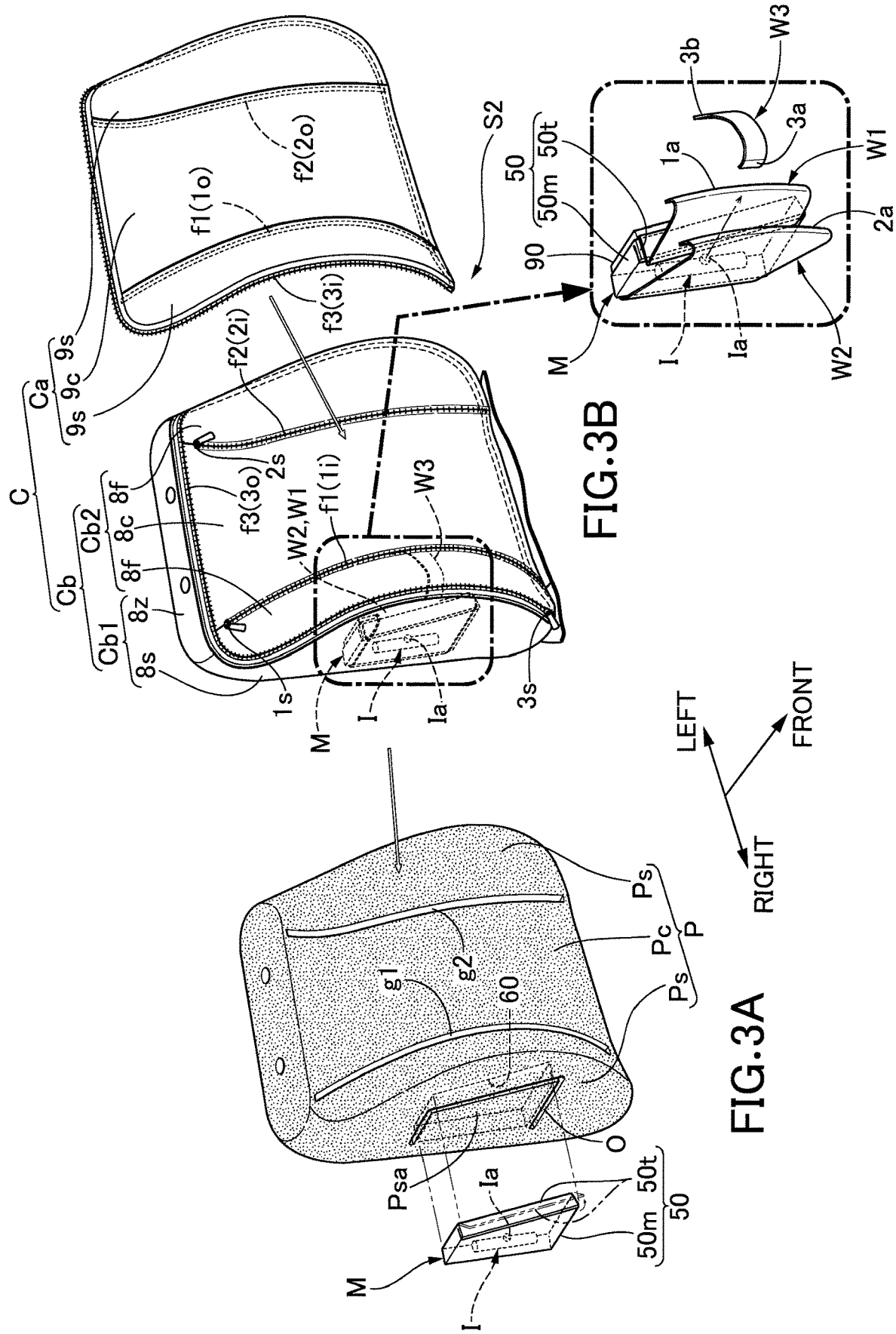
FIG. 3A is a perspective view showing a state of the back pad on its own from which all of the seat back outer skin is removed.
FIG. 3B is a perspective view showing a state in which a base skin portion of the seat back outer skin is mounted on the back pad (a state in which an easily removable skin is not fitted).

Although the embodiments illustrate a case in which the portions 8c, 8f, 8s, 8z; 9c, 9s of the base skin Cb and the easily removable skin Ca of the back pad outer skin C are formed from a single layer sheet material (for example a fabric material), the side face base skin portion 8s may be formed from, for example, a layered body as shown in for example FIG. 3 of Japanese Patent Application Laid-open No. 2014-129059 in which a thin cushion material layer is laminated onto the reverse face of an outer skin (for example a fabric material), and the bolster-side and middle-side front face base skin portions 8f, 8c may be formed from a similarly layered body. Alternatively, the middle part removable skin portion 9c and/or the side part removable skin portion 9s of the easily removable skin Ca may be formed from the layered body.

The embodiments illustrate a case in which, in the bolster pad part Ps, the sewn part T1 between adjacent end parts of the first base skin portion Cb1 (in particular the side face base skin portion 8s) and the second base skin portion Cb2 (in particular the bolster-side front face base skin portion 8f) of the seat back outer skin C is disposed so as to go along the border part between the front face and the side face of the bolster pad part Ps or the vicinity thereof, but the position for the sewn part T1 to go along may be slightly displaced rearward or inward in the left-right direction from the border part or the vicinity thereof. For example, in the case of the former the outer edge of the front face base skin portion 8f is extended slightly toward the side face of the bolster pad part Ps beyond the border part, and in the case of the latter the front edge of the side face base skin portion 8s is extended slightly toward the front face side of the bolster pad part Ps beyond the border part, but the amount of extension should be limited to a range in which the anticipated effects of the present invention can be achieved.

The first and third to fifth embodiments illustrate a case in which both the inner webbing W1 and the outer webbing W2 are provided as the expansive force transmission webbing provided on the bolster pad part Ps, but the outer webbing W2 may be omitted as in the second embodiment. Therefore, in the first and third to fifth embodiments, another embodiment (not illustrated) in which the outer webbing W2 is omitted can be implemented. In the second embodiment, another embodiment (not illustrated) in which the outer webbing W2 is provided in addition to the inner webbing W1 can be implemented. Furthermore, another embodiment in which the inner webbing W1 is omitted and only the outer webbing W2 is provided as an expansive pressure-transmitting webbing in the embodiments may be implemented.

Furthermore, the embodiments illustrate a case in which the airbag module M includes the flattened box-shaped module case 50 housing the airbag A in a folded state and the inflator I, but a caseless airbag module (see for example FIG. 3 of Japanese Patent Application Laid-open No. 2014-210475) in which the module case is omitted may be employed.

The embodiments illustrate a case in which the pulling-in member J for pulling in and fixing the back pad outer skin C and the bolster webbing W1 to the interior of the pulling-in grooves g1, g2 is made to latch onto a support member (the insert wires 71, 72) extending lengthwise within the pulling-in grooves g1, g2, but the back pad P may be provided with a pulling-in hole extending through the back pad P in the fore-aft direction and opening on a bottom part of the pulling-in grooves g1, g2, and the pulling-in member J pulled out toward the rear face side of the back pad P through the pulling-in hole may be made to latch onto and linked to a support frame, which is not illustrated, fixed to the side frame 20. Alternatively, in the case of a seat structure in which the pulling-in hole is close to the side frame 20, the wire 28, the spring 29, or the pressure-receiving plate 24, the support frame may be omitted and the pulling-in member J may be made to directly latch onto and link to a to-be-latched part (for example a through hole, a hook-shaped projection part, etc.), which is not illustrated, provided on the side frame 20, the wire 28, the spring 29, or the pressure-receiving plate 24.

Furthermore, the embodiments illustrate the pulling-in member J with a hook shape, but the pulling-in member J is not limited to the hook shape. That is, various types of shapes that can be made to latch and link to a through hole, etc. of the insert wires 71, 72, the side frame 20, the wire 28, the spring 29, or the pressure-receiving plate 24 are possible.

The embodiments illustrate, as a linking tool that detachably links the easily removable skin Ca to the base skin Cb, one employing the first to third fasteners f1 to f3, which are slide fasteners, but the linking tool is not limited to that of the embodiments, and for example a hook-and-loop fastener, a snap button, etc. may be used.

Moreover, the embodiments illustrate a case in which part (a majority) of the front face of the bolster pad part Ps is covered by the side part removable skin portion 9s of the easily removable skin Ca, but the entirety of the front face of the bolster pad part Ps and at least part of the side face may be covered.

Figure 1:
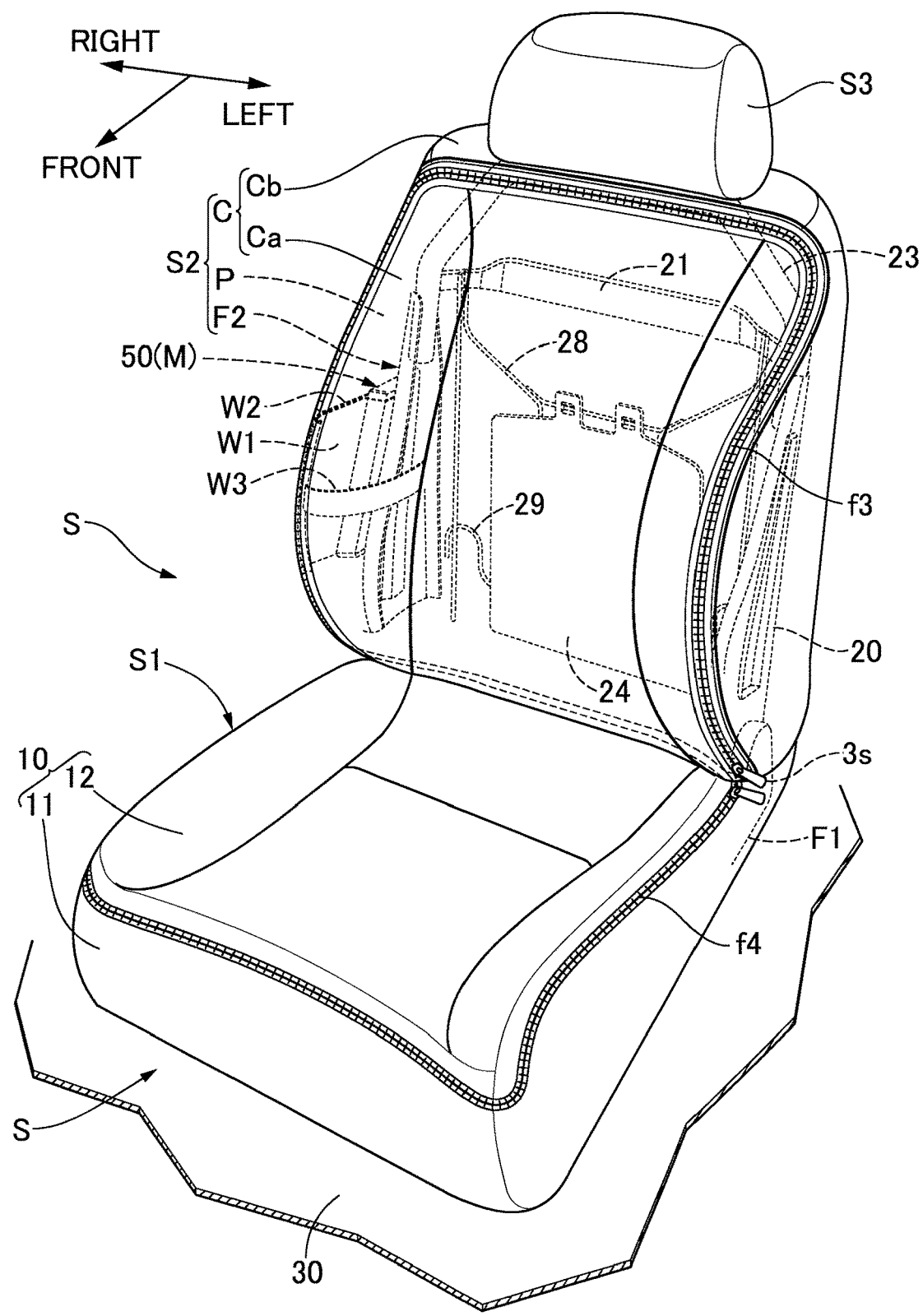
FIG. 1 is an overall perspective view showing an automobile seat related to a first embodiment of the present invention.

The embodiments illustrate a case in which the sitting part outer skin 10 of the seat sitting part Si is formed, as shown in FIG. 1, from the base skin 11 and the easily removable skin 12 detachably linked to the base skin 11 via the fastener f4 (the linking tool), but with regard to the outer skin 10 of the seat sitting part S1 it is unnecessary for part thereof to be the easily removable skin 12, that is, it may be a normal skin structure for the seat sitting part that is not easy to replace.

What is claimed is:

1. A vehicle seat comprising a seat back that includes a back pad supported on a frame and supporting a back of an occupant, the back pad having a middle pad part and left and right bolster pad parts connected to left and right sides of the middle pad part, and a back pad outer skin covering a surface of the back pad, the back pad outer skin having a cover skin detachably mounted on the seat back, and the bolster pad part on a door side having thereinside an airbag module including an airbag, the back pad outer skin having a first portion covering a surface of one part, including a side face, of the bolster pad part, and a second portion covering a surface of another part that is different from the one part of the bolster pad part, a bound part being formed by binding to each other mutually adjacent end parts of the first portion and the second portion and an extremity part of an expansive force transmission webbing having a base portion fixed to the frame, the bound part being capable of breaking when the airbag is made to expand, and a non-stretchable cloth member being disposed on a reverse side of a specific outer skin portion, covering a front face of the bolster pad part, of the second portion.

2. The vehicle seat according to claim 1, wherein
the back pad outer skin includes a base skin retained by the frame or the back pad, and a cover skin that is detachable from the base skin, and
the base skin includes on left and right a first base skin portion forming the first portion and a second base skin portion forming the second portion.

3. The vehicle seat according to claim 2, wherein
the cloth member includes a base portion fixed to the frame or the back pad and an extremity portion bound together with the second base skin portion and an extremity portion of the expansive force transmission webbing by the bound part, and
an intermediate part of the cloth member is disposed so as to transect a front face of the bolster pad part and overlap a reverse face of the specific outer skin portion.

4. The vehicle seat according to claim 2, wherein
the second base skin portion at least partially includes a specific portion covering a front face of the bolster pad part, and
the specific portion and a portion, overlapping the specific portion, of the cover skin form the specific outer skin portion.

5. The vehicle seat according to claim 2, wherein a portion, directly covering a front face of the bolster pad part without the second base skin portion interposed therebetween, of the cover skin forms the specific outer skin portion.

6. The vehicle seat according to claim 1, wherein
the cover skin is attached to the first portion by a fastener, and
a mounting piece portion, extending on the first portion side, of the fastener is bound together with the extremity portion of the expansive force transmission webbing, by the bound part.

7. The vehicle seat according to claim 1, wherein
the back pad outer skin includes a base skin forming the first portion and a cover skin forming the second portion,
the cover skin is attached to the first portion by a fastener, and
a mounting piece portion, extending on the first portion side, of the fastener is bound together with the extremity portion of the expansive force transmission webbing by the bound part.

8. The vehicle seat according to claim 7, wherein
the cloth member includes a base portion fixed to the frame or the back pad and an extremity portion bound together with the mounting piece portion and the extremity portion of the expansive force transmission webbing by the bound part, and an intermediate part of the cloth member is disposed so as to transect a front face of the bolster pad part and overlap a reverse face of the specific outer skin portion.

9. The vehicle seat according to claim 1, wherein at least the specific outer skin portion of the back pad outer skin is formed from a material that is easier to stretch than the cloth member to such a degree that the material stretches in a vehicle width direction by receiving an expansive force of the airbag.

10. The vehicle seat according to claim 1, wherein the expansive force transmission webbing is formed so as to have a vertical width that is substantially same as or larger than a vertical width of the airbag module from the base portion to the extremity portion of the expansive force transmission webbing.

11. The vehicle seat according to claim 1, wherein the cloth member is formed from a stretch-suppressing webbing.

12. The vehicle seat according to claim 11, wherein at least an extremity portion of the stretch-suppressing webbing is formed so as to have a smaller width than that of the expansive force transmission webbing in an up-down direction.

13. The vehicle seat according to claim 11, wherein the stretch-suppressing webbing is formed into a strip shape having a smaller width than that of the expansive force transmission webbing in the up-down direction.

14. The vehicle seat according to claim 12, wherein the airbag module includes at least the airbag in a folded state and an inflator capable of blowing out a high pressure gas into the airbag and making the airbag expand toward a front side of a vehicle, and the extremity portion, bound by the bound part, of the stretch-suppressing webbing is disposed at substantially same height as that of a high pressure gas-blowing out hole, opening toward the front side of the vehicle, of the inflator.

15. The vehicle seat according to claim 1, wherein the cloth member is formed so as to have a vertical width that is same as or greater than the vertical width of the expansive force transmission webbing in an up-down direction.

16. The vehicle seat according to claim 1, wherein the bound part is disposed on a border part between a front face and a side face of the bolster pad part or in a vicinity of the border part.

17. The vehicle seat according to claim 1, wherein a pulling-in member for pulling in the specific outer skin portion into a pulling-in groove provided between the bolster pad part and the middle pad part is mounted directly or indirectly on the frame or the back pad, and a base portion of the cloth member is fixed to the pulling-in member.

* * * * *